(12) United States Patent
Jeon et al.

(10) Patent No.: US 11,561,723 B2
(45) Date of Patent: Jan. 24, 2023

(54) STORAGE SYSTEM PERFORMING OVERWRITE, HOST SYSTEM CONTROLLING STORAGE SYSTEM, AND OPERATING METHOD FOR STORAGE SYSTEM

(71) Applicant: SAMSUNG ELECTRONICS CO., LTD., Suwon-si (KR)

(72) Inventors: Jekyeom Jeon, Siheung-si (KR); Jooyoung Hwang, Suwon-si (KR); Jeonguk Kang, Seongnam-si (KR); Junhee Kim, Suwon-si (KR); Sunghyun Noh, Seoul (KR); Keunsan Park, Hwaseong-si (KR); Byungki Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 17/193,140

(22) Filed: Mar. 5, 2021

(65) Prior Publication Data
US 2022/0050620 A1    Feb. 17, 2022

(30) Foreign Application Priority Data
Aug. 11, 2020    (KR) .................. 10-2020-0100739

(51) Int. Cl.
G06F 3/06    (2006.01)
(52) U.S. Cl.
CPC .......... G06F 3/0655 (2013.01); G06F 3/0604 (2013.01); G06F 3/0679 (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 8,583,879 B2 | 11/2013 | Na et al. | |
| 9,111,598 B2 | 8/2015 | Jibbe et al. | |
| 9,304,937 B2 | 4/2016 | Achilles et al. | |
| 9,747,298 B2 | 8/2017 | Bandarupalli et al. | |
| 10,504,566 B2 | 12/2019 | Hong | |
| 2012/0030408 A1* | 2/2012 | Flynn | G06F 3/0643 |
| | | | 711/E12.001 |

(Continued)

FOREIGN PATENT DOCUMENTS

KR    10-1834082 B1    2/2018

OTHER PUBLICATIONS

European Search Report dated Dec. 8, 20221 Cited in EP Patent Application No. 21180697.1.

*Primary Examiner* — Ryan Bertram
(74) *Attorney, Agent, or Firm* — Volentine, Whitt & Francos, PLLC

(57) ABSTRACT

A storage system performing an overwrite, a host system controlling the storage system, and an operating method of the storage system, wherein the storage system includes a memory device; and a controller that receives new data and an overwrite request from the host system, wherein the overwrite request includes a first logical address for old data and a second logical address for the new data, and performs an overwrite operation by writing the new data corresponding to the second logical address to the memory device and invalidating the old data corresponding to the first logical address according to the overwrite request.

20 Claims, 14 Drawing Sheets

(56) References Cited

U.S. PATENT DOCUMENTS

| | | | |
|---|---|---|---|
| 2014/0006685 A1* | 1/2014 | Peterson | G06F 12/0238 |
| | | | 711/102 |
| 2015/0006793 A1 | 1/2015 | Shin et al. | |
| 2015/0052395 A1* | 2/2015 | Wipfel | G06F 3/064 |
| | | | 714/19 |
| 2015/0134621 A1* | 5/2015 | Ki | G06F 16/16 |
| | | | 707/689 |
| 2016/0085796 A1* | 3/2016 | Ki | G06F 16/122 |
| | | | 707/695 |
| 2016/0218739 A1* | 7/2016 | Lee | G06F 12/0207 |
| 2017/0160933 A1* | 6/2017 | De Jong | G06F 3/0656 |
| 2017/0235486 A1* | 8/2017 | Martineau | G06F 3/0616 |
| | | | 711/103 |
| 2018/0067691 A1* | 3/2018 | Zhou | G06F 3/0619 |

\* cited by examiner

FIG. 3

| OLD DATA START ADDRESS | OLD DATA SIZE | NEW DATA START ADDRESS | NEW DATA SIZE | WRITE COMMAND TYPE | ATOMIC OPERATION | ATOMIC OPERATION END COMMAND |

STORAGE SYSTEM PERFORMING OVERWRITE, HOST SYSTEM CONTROLLING STORAGE SYSTEM, AND OPERATING METHOD FOR STORAGE SYSTEM

CROSS-REFERENCE TO RELATED APPLICATION

This application claims priority under 35 U.S.C. § 119 to Korean Patent Application No. 10-2020-0100739 filed on Aug. 11, 2020 in the Korean Intellectual Property Office, the subject matter of which is hereby incorporated by reference.

BACKGROUND

The inventive concept relates generally to storage systems, and more particularly, to storage systems performing an overwrite operation. The inventive concept also relates to host systems controlling such storage systems and operating methods for storage systems.

When updating data, a file system, such as Ext4 (i.e., a journaling file system and 4th extended filesystem for Linux), overwrites new data at an original location of old data. This approach is referred to as an in-place update. In contrast, a log-structured file system (LFS) uses an out-of-place update approach, in which old data is invalidated and new data is written at a different location than an original location of the old data.

Because a logical address of old data is different from a logical address of new data in an LFS during a data update, the old data is not invalidated in relation to a write request including the address of the new data. As a result, an additional operation is required to invalidate the old data. The execution of this additional invalidation operation wastes storage system resources and occupies valuable host system cycles.

SUMMARY

Embodiments of the inventive concept provide storage systems efficiently performing invalidation of old data and writing of new data based on information included in a write command Embodiments of the inventive concept also provide host systems capable of controlling such storage systems and operating methods for such storage systems.

According to an aspect of the inventive concept, there is provided a storage system configured to communicate with a host system. The storage system includes; a memory device and a controller configured to receive new data and an overwrite request from the host system, wherein the overwrite request includes a first logical address for old data and a second logical address, different from the first logical address, for the new data, and perform an overwrite operation by writing the new data corresponding to the second logical address to the memory device and invalidating the old data corresponding to the first logical address in response to the overwrite request.

According to an aspect of the inventive concept, there is provided a controller for a storage system configured to communicate with a host system, the further configured to receive new data and an overwrite request from the host system, wherein the overwrite request includes a first logical address for old data and a second logical address, different from the first logical address, for the new data, and perform an overwrite operation by writing the new data corresponding to the second logical address to a memory device and invalidating the old data corresponding to the first logical address in response to the overwrite request.

According to an aspect of the inventive concept, there is provided an operating method for a storage system configured to communicate with a host system. The operating method includes; receiving new data and an overwrite request corresponding to a file update request from the host system, wherein the overwrite request including a first logical address for old data and a second logical address, different from the first logical address, for the new data, writing the new data corresponding to the second logical address to a memory device of the storage system in response to the overwrite request, and updating the memory device according to metadata for the old data and metadata for the new data in response to an overwrite operation performed in response to the overwrite request.

BRIEF DESCRIPTION OF THE DRAWINGS

Embodiments of the inventive concept may be more clearly understood upon consideration of the following detailed description taken in conjunction with the accompanying drawings in which:

FIG. 3 is a conceptual diagram illustrating an example of a data field according to embodiments of the inventive concept;

DETAILED DESCRIPTION

Hereinafter, certain embodiments of the inventive concept will be described in some additional detail with reference to the accompanying drawings. Throughout the written description and drawings like reference numbers and labels are used to denote like or similar elements and/or features.

Figure 1:
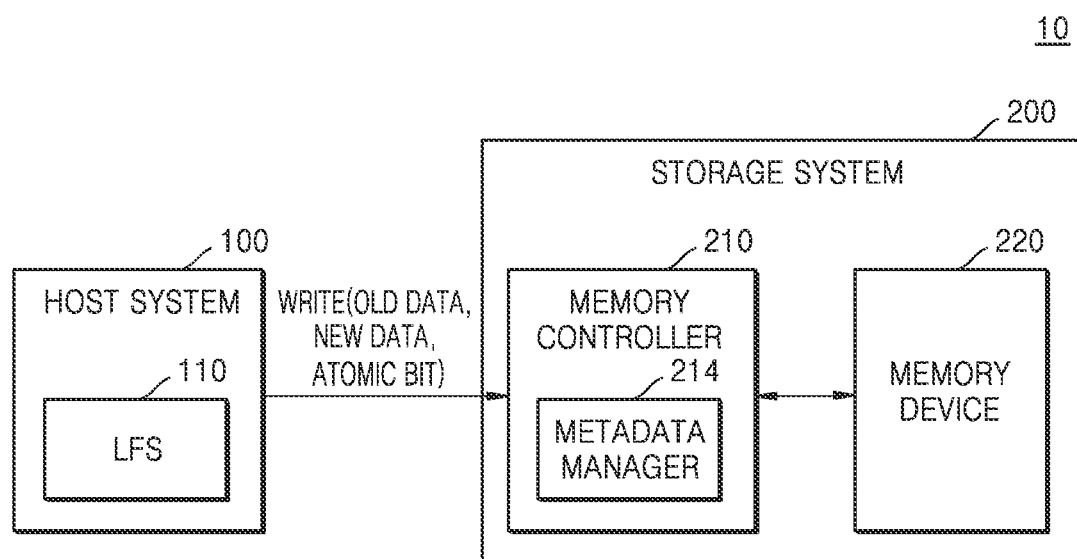
FIG. 1 is a block diagram of a data processing system according to embodiments of the inventive concept.
Figure 2:
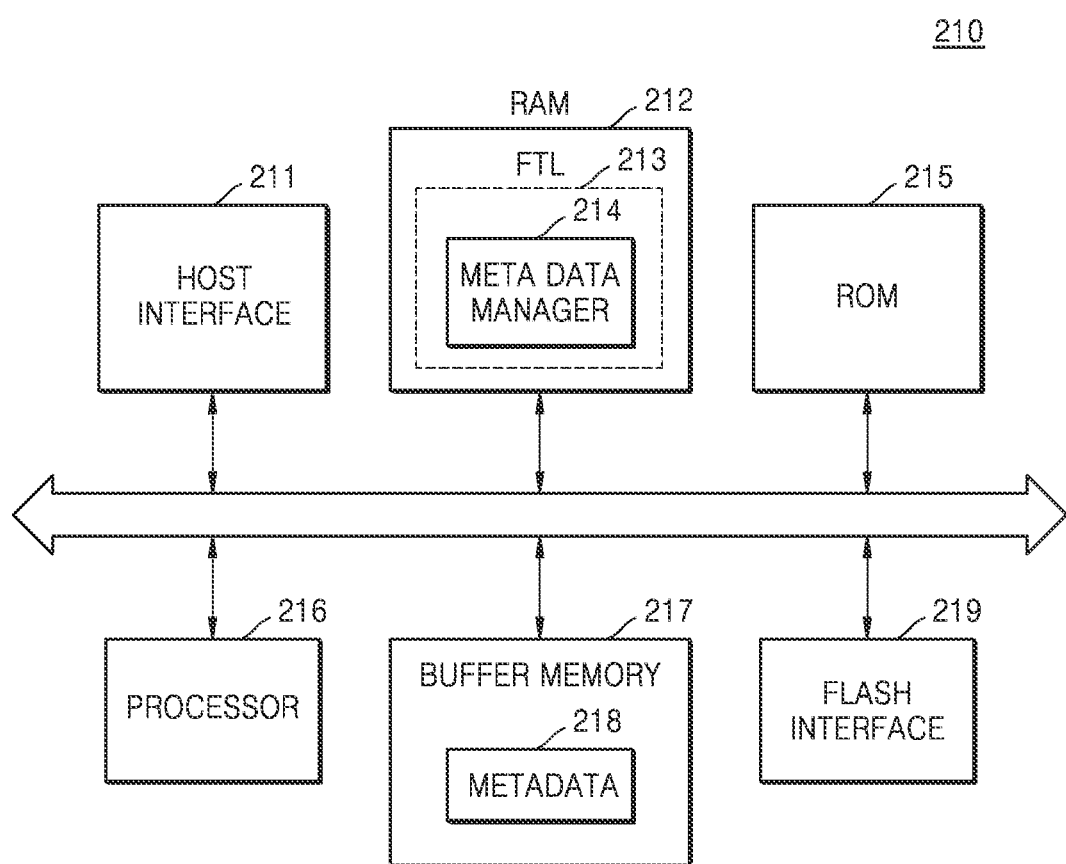
FIG. 2 is a block diagram further illustrating in one example the memory controller 210 of FIG. 1.

FIG. 1 is a block diagram illustrating a data processing system 10 according to embodiments of the inventive concept, and FIG. 2 is a block diagram further illustrating in one example the memory controller 210 of FIG. 1.

Referring to FIG. 1, the data processing system 10 may generally include a host system 100 and a storage system 200. The storage system 200 may include a memory controller 210 and a memory device 220. The host system 100 may provide data write request(s), data read request(s) and/or data erase request(s) to the storage system 200. Upon receiving a data erase request from the host system 100, the storage system 200 may perform an erase operation on data in a region designated by the host system 100.

The host system 100 may include a file system, wherein the file system processes input data, such that input data is stored at a particular logical or physical location in the storage system 200. That is, when the host system 100 receives data through a user application (not shown), the host system 100 may process the data using the file system and then store the data in the storage system 200.

In some embodiments, the file system may include a log-structured file system (LFS) 110, such as (e.g.,) a flash-friendly file system (F2FS) designed for a Linux kernel based on characteristics of flash memory, or a journaling flash file system (JFFS) which is a Linux LFS used in relation to NOR flash memory devices. However, the scope of the inventive concept is not limited to the LFS, but may be applied to any file system capable of writing new data to a different address (e.g., a different logical address) than the address of old data when a file is updated.

Referring to FIGS. 1 and 2, the memory controller 210 may include a metadata manager 214 managing metadata 218. Here, the metadata 218 may include mapping information for translating logical address(es) into corresponding physical address(es) to access information stored in the memory device 220.

The storage system 200 may include storage media for storing data at the request of the host system 100. For example, the storage system 200 may include at least one solid state drive (SSD). When the storage system 200 includes an SSD, the memory device 220 may include flash memory chips (e.g., NAND memory chips) storing data in a non-volatile manner. The memory device 220 may correspond to a single flash memory device or include a memory card including at least one flash memory chip.

When the storage system 200 includes flash memory, the flash memory may include a two-dimensional (2D) NAND memory array or a three-dimensional (3D) NAND or vertical NAND (VNAND) memory array. The 3D memory array may be monolithically formed at least one physical level of arrays of memory cells, which have an active region on a silicon substrate, or a circuit, which is involved in the operation of the memory cells and formed on or in the substrate. The term "monolithic" means that layers of each level of an array are directly stacked on layers of an underlying level of the array.

In some embodiments, the 3D memory array may include VNAND strings, which are arranged in a vertical direction so that at least one memory cell is placed on another memory cell. The memory cell may include a charge trap layer.

Exemplary structures of a 3D memory array, in which the 3D memory array includes multiple levels—and word lines and/or bit lines shared across the multiple levels—are disclosed, for example, in U.S. Pat. Nos. 7,679,133; 8,553,466; 8,654,587; and 8,559,235, as well as published U.S. Patent Application No. 2011/0233648, the collective subject matter of which is hereby incorporated by reference.

In some embodiments, the storage system 200 may include other various kinds of memory. For example, the storage system 200 may include various types of non-volatile memory, such as magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronics memory, and insulator resistance change memory.

The memory device 220 may include an embedded multimedia card (eMMC) or an embedded universal flash storage (UFS) memory device. For example, the memory device 220 may include an external memory removable from the storage system 200. More particularly, the memory device 220 may include a UFS memory card, a compact flash (CF) card, a secure digital (SD) card, a micro-SD card, a mini-SD card, an extreme digital (xD) card, or a memory stick but is not limited thereto.

The host system 100 may communicate with the storage system 200 through various interfaces. For example, the host system 100 may communicate with the storage system 200 through various interfaces such as a universal serial bus (USB) interface, an MMC interface, a peripheral component interconnect express (PCIExpress) interface, an advanced technology attachment (ATA) interface, a serial ATA (SATA) interface, a parallel ATA (PATA) interface, a small computer system interface (SCSI), a serial attached SCSI (SAS), an enhanced small disk interface (ESDI), an integrated drive electronics (IDE) interface, and a non-volatile memory express (NVMe) interface.

When the host system 100 updates data of a file with new data, the host system 100 may transmit a request (or a write command) to write the new data to the storage system 200.

When an update is performed by overwriting old data with new data in the same location, writing of the new data may be simultaneously performed with erasure of the old data. However, an LFS does not permit overwriting, and flash memory does not support data overwriting.

In the case of a usual NVMe interface, a fused operation allowing two commands to be executed like a single command is supported so that invalidation (or erasure) of old data may be performed. For example, when the host system 100 transmits both a write command and an erase command to the storage system 200, the memory controller 210 may invalidate (or erase) old data by sequentially performing a write operation and an erase operation using a fused operation. However, in this case, the metadata 218 in a buffer memory 217 of FIG. 2 must be accessed two times during the two operations, thereby causing operational inefficiency.

In the case of a LFS, the logical address (or location) at which old data is stored may be different from a logical address at which new data is written. Accordingly, when a write command including information for only the new data is transmitted, the host system 100 must separately transmit a trim command in order to invalidate the old data. For example, the file system of the host system 100 must invalidate (or erase) old data by transmitting a trim command including a logical address of the old data to the storage system 200.

However, until the storage system 200 is provided with a trim command, information associated with the old data is unknown to the storage system 200, and both old data and new data are technically valid. And this outcome creates limit(s) on the management of valid data and invalid data in the storage system 200. For example, an unnecessary copy operation may be performed during an internal garbage collection operation, thereby increasing memory system overhead. That is, the memory system management overhead may be unnecessarily increases by the two-times accessing of metadata when two operations (i.e., a write operation and an erase operation) are sequentially performed and may also occur due to timing differences between a write command and a trim command.

In the data processing system 10 of FIGS. 1 and 2, the LFS 110 provides information about old data to the storage system 200 together with information about new data requested to be written, such that writing and invalidation may be simultaneously performed. Thus, in some embodiments, old data may be described as being erased or invalidated, however in the description that follows the old data will be described as being invalidated.

Accordingly, the host system 100 may generate a write command which includes both information about new data and information about old data, and provide the write command to the storage system 200. Hereinafter, it is assumed that a write command may include information about only new data, or information about both new data and old data. In this case, a write command including information about old data may be referred to as an overwrite request. That is, a write command including information about new data and information about old data may be referred to as an overwrite request, and a resulting operation of updating a file according to the write command (i.e., the overwrite request) may be referred to as an overwrite operation.

To distinguish a write command which includes information about old data, consistent with embodiments of the inventive concept, from a conventional write command, a new field may be added to the write command One example of this approach will be described hereafter in some additional detail with reference to FIG. 3. Hereinafter, unless a field value of a write command is specifically stated, it is assumed that the write command includes information about old data.

Referring to FIGS. 1 and 2, the memory controller 210 may receive information about old data together with a write command for new data, invalidate the old data by processing information included in the metadata 218 based on the information about the old data, and write the new data to the memory device 220. For example, the invalidation of the old data may be performed by the metadata manager 214 of the memory controller 210.

The host system 100 may transmit a command, data, and information about the data to the storage system 200. For example, in the case of a write command, the host system 100 may transmit data to be written and information about the data to the storage system 200 together with the write command. The information about data may include information, such as the logical address of the data, the size of the data, or an attribute of the data, which is used to store and manage the data.

Hereinafter, it is assumed that a command generated by the file system of the host system 100 includes information such as a data address or a data size. For example, the host system 100 may generate and transmit a command including fields in FIG. 3 to the storage system 200.

The file system of the host system 100 may identify the size of information included in a write command and split the write command into a plurality of write commands when the size of the information exceeds a certain reference value. For example, when the size of an address of old data or information about the old data, each included in a write command, is 12 KB, the write command may be split into three write commands based on 4 KB. In addition, when the size of new data to be written according to a write command exceeds a certain reference value, the write command may be split into a plurality of write commands.

When the file system transmits a plurality of write commands resulting from splitting to the storage system 200, a field indicating a characteristic of each of the write commands may be added to each write command. For example, a field indicating whether the storage system 200 supports an atomic operation or a field indicating whether a current write command is executed by an atomic operation may be added. The atomic operation may refer to a single operation that is indivisible. Thus, in this written description, an atomic operation may refer to atomic writing.

A command generated by the host system 100 may be in a submission queue of certain memory included in the host system 100. The submission queue may correspond to a circular buffer, in which a command is stored after being generated and before being executed.

After execution of a command, the storage system 200 may transmit completion information, which indicates that the execution of the command has been completed, to the host system 100.

Referring to FIGS. 1 and 2, the memory controller 210 may include a host interface 211, RAM 212, read-only memory (ROM) 215, a processor 216, a buffer memory 217, and a flash interface 219.

In some embodiments, the host interface 211 may communicate with the host system 100 to transmit various requests and receive various kinds of information. For example, the host interface 211 may receive a write command and information about new data from the host system 100. Or the host interface 211 may receive a write command, information about new data, and information about old data corresponding to the new data. Information received by the host interface 211 may vary with a field value of a received write command.

During an initial interconnection between the host system 100 and the storage system 200, for example, the definition (or meaning) of each write command field may be variously stored in the RAM 212 and/or the ROM 215 of the memory controller 210.

For example, when the storage system 200 supports atomic writing, the host interface 211 may receive a field value indicating whether a write command is executed by the atomic writing. This indicates that a write command has been split into a plurality of write commands (respectively associated with partial data resulting from a splitting of data) because of the large size of data to be written and that a write operation corresponding to each of the write commands is performed while an atomic operation is ensured.

The host interface 211 may communicate with the host system 100 using one or more interface(s). For example, the host interface 211 may communicate with the host system 100 according various interfaces such as an NVMe interface and a UFS interface.

The RAM 212 may include a flash translation layer (FTL) 213. The FTL 213 refers to middleware mapping a logical address (e.g., a logical block address (LBA)) of the file system of the host system 100 and a physical address (e.g., a physical block address (PBA)) of the memory device 220 between the file system of the host system 100 and the memory device 220.

Besides the address mapping, the FTL 213 may perform (or contribute to the performing of) a wear leveling operation that manages the wear level of the constituent memory cells in the memory device 220, and/or a garbage collection operation that manages the generation of free block(s) within the memory system. Here, the FTL 213 may include the metadata manager 214.

The metadata manager 214 may manage the metadata 218 in a meta area according to a write command from the host system 100.

The metadata manager 214 may store information about new data and/or old data included in a write command in the buffer memory 217, and may selectively update the metadata 218 in the meta area.

For example, the metadata manager 214 may store metadata, which is changed during an overwrite corresponding to each of a plurality of commands, in the buffer memory 217. For example, the metadata manager 214 may buffer metadata, which is changed during an overwrite corresponding to each of a plurality of commands, in the buffer memory 217 during the overwrite and may update the metadata 218 in the buffer memory 217 with the buffered metadata after an overwrite corresponding to the last one of the commands is completed.

An update of the metadata 218 may refer to an operation of adding or changing mapping information between a logical address of new data and a physical address of the new data to the metadata 218, and invalidating mapping information between a logical address of old data and a physical address of the old data.

The ROM 215 may store a program executed by the processor 216. A program for implementing an operation of the memory controller 210 or firmware having the program recorded therein may be stored in the ROM 215.

The processor 216 may generally control operations of the storage system 200 by executing various programs stored in the ROM 215. The processor 216 may execute a program forming the metadata manager 214.

The buffer memory 217 may temporarily store data received from the host system 100 through the host interface 211 or data received from the memory device 220 and may store the metadata 218.

The metadata 218 is various kinds of information needed for the storage system 200 to manage and store data. For example, the metadata 218 may include mapping information between a logical address and a physical address used to write or read data or information indicating whether data is valid.

A meta area refers to an area, in which the metadata 218 is stored, and may be included in the buffer memory 217. A place where the metadata 218 is stored is not limited to the buffer memory 217. The metadata 218 may be stored in a storage circuit of an internal cache (not shown) of the memory controller 210 or stored in the memory device 220 in a non-volatile manner Hereinafter, it is assumed that the metadata 218 is stored in the buffer memory 217, as shown in FIG. 2.

The buffer memory 217 may include volatile memory, such as dynamic RAM (DRAM), synchronous DRAM (SDRAM), double data rate (DDR) SDRAM, low-power DDR (LPDDR) SDRAM, or graphics RAM (GRAM), or non-volatile memory, such as FeRAM, resistive RAM (RRAM), spin-transfer torque MRAM (STT-MRAM), or PRAM.

The flash interface 219 may be configured to control signals driving the memory device 220 and to access the memory device 220 under the control of the processor 216. The flash interface 219 may be configured to selectively perform software and hardware interleaving operations through at least one channel.

The flash interface 219 may also provide an interface with a plurality of storage media included in a storage device. For example, the flash interface 219 may independently communicate with storage media through a plurality of channels.

Although an example of performing a write operation with software is illustrated in FIG. 2, the scope of the inventive concept is not limited thereto. For example, at least some of operations performed by executing software loaded to the RAM 212 and the ROM 215 in the embodiment of FIG. 2 may be performed by circuit(s) implemented in hardware.

In some embodiments, when a file update request is generated in the host system 100, the host interface 211 may receive a write command and a logical address of new data from the host system 100. In some embodiments, the write command may include a logical address of old data corresponding to the new data. Information about new data or old data in the write command may be temporarily stored in the buffer memory 217.

The FTL 213 may acquire a physical address corresponding to the logical address of the new data based on mapping information included in the metadata 218. The processor 216 may write the new data to the physical address in the memory device 220 through the flash interface 219.

Here, the metadata manager 214 may reflect the information about the new data and the information about the old data, which are stored in the buffer memory 217, in the metadata 218. For example, the old data may be invalidated using the logical address of the old data.

Thereafter, the FTL 213 may perform garbage collection based on the metadata 218 that has been updated.

That is, the memory controller 210 receives information about new data and information about old data through a single command so that writing of the new data and invalidation of the old data may be efficiently performed even in an LFS that does not permit overwriting.

FIG. 3 is a conceptual diagram illustrating in one example the data structure of a write command that may be used in relation to certain embodiments of the inventive concept. Here, it is assumed that the file system of the host system 100 may generate the write command including a plurality of fields.

The write command may be generated in response to an overwrite request. As described above with reference to FIG. 1, an overwrite operation may refer to simultaneously performing invalidation of information about old data and writing of new data in the present embodiment. Accordingly, the host system 100 may transmit a write command to the storage system 200—that is, the host system 100 may transmit an overwrite request to the storage system 200.

In some embodiments, an overwrite may refer to an operation of writing new data to an address (or location) different from an address at which old data has been written and invalidating the old data. In contrast, a conventional write command may include information about only new data. For example, this information may include a logical address of the new data and may further include the size of the new data.

In some embodiments, the file system of the host system 100 may generate a write command including information about new data and information about old data. Accordingly, the host system 100 may transmit both information about new data to be written and information about old data to be invalidated to the storage system 200 through a single command.

A write command may include various kinds of information related to a write operation in addition to information about new data or information about old data. To indicate the kinds of information the write command may include, data fields of FIG. 3 may be used.

That is, certain data fields of a write command generated by the file system of the host system 100 may include an old data start address field indicating a start point of a logical address of old data, an old data size field, a new data start address field indicating a start point of a logical address of new data, and a new data size field. For convenience of description, these fields may be respectively referred to as first, second, third and fourth fields (collectively, "first through fourth fields").

A write command does not need to include all of first through fourth fields and may include only minimum information for executing the write command. For example, the write command may include only a logical address of new data and a logical address of old data. Alternately, the file system of the host system 100 may include information about only new data in a write command. For example, a write command may include only a logical address of only new data.

To indicate the kind of information included in a write command, the file system of the host system 100 may use a particular field in the write command. For example, the host system 100 may further include in a write command, a write command type field indicating whether the write command includes information about only new data (as is conventional), or further includes information about old data for overwriting. The write command type field may conveniently be referred to as a fifth field. For example, when a value of the fifth field (i.e., the write command type field) is 0, a write command may not include field values respectively corresponding to an old data start address and an old data size. Accordingly, invalidation of old data may not be performed. However, when the value of the fifth field (i.e., the write command type field) is 1, the host system 100 may generate a write command including the first through fourth fields. In this case, the write command includes a logical address of old data, and accordingly, invalidation of the old data may be performed.

In some embodiments, the host system 100 may further include in a write command, a field indicating whether the storage system 200 supports an atomic write operation. Thus, the host system 100 may indicate whether the storage system 200 supports an atomic write operation during a process of initially connecting to the storage system 200 and initializing the storage system 200. For example, the storage system 200 may transmit to the host system 100 information including whether or not atomic operation is supported.

Thereafter, when a file update request is generated in the host system 100, the file system of the host system 100 may allow a file update to be performed by an atomic operation. For example, the file system may mark an atomic operation field such that write commands used for a file update are executed by an atomic write operation. The atomic operation field may conveniently be referred to as a sixth field.

For example, when the storage system 200 receives a write command having 0 as a value of the sixth field (i.e., the atomic operation field), the storage system 200 may perform a conventional write operation without a concern about atomic writing. However, when receiving a write command having 1 as the value of the sixth field (i.e., the atomic operation field), the storage system 200 may buffer information about old data, which is included in the write command according to a preset protocol, and may later update the metadata 218. Accordingly, the metadata 218 of a file to be updated may be reflected in the storage system 200.

The file system may designate a command to be executed by an atomic write operation when a command needs to be split into a plurality of commands because of a large data size (i.e., a bulk of data must be split into partial data). Accordingly, a plurality of commands are transmitted to the storage system 200 during an update of a single file. That is, to update the metadata 218 of the file, the storage system 200 must identify the last one of the sequentially received commands. This is because the storage system 200 reflects information, which is included in the received commands and stored in the buffer memory 217, in the metadata 218 after identifying the last command Therefore, the file system must add an atomic operation end command field indicating the last one of commands resulting from splitting of a command. The atomic operation end command field may be referred to as a seventh field. Here, the seventh field (i.e., the atomic operation end command field) may have a value only when the sixth field (i.e., the atomic operation field) has a value of 1. When the sixth field (i.e., the atomic operation field) has a value of 0, the seventh field (i.e., the atomic operation end command field) may be a null field.

The file system of the host system 100 may set, to a first value, the seventh field (i.e., the atomic operation end command field) of the last one of a plurality of overwrite requests and may set, to a second value different from the first value, the seventh field (i.e., the atomic operation end command field) of each of the other overwrite requests.

For example, when receiving a write command having 0 as the value of the seventh field (i.e., the atomic operation end command field), the storage system 200 may buffer information included in the write command in the buffer memory 217. When receiving a write command having 1 as the value of the seventh field (i.e., the atomic operation end command field), the storage system 200 may update the metadata 218 based on information buffered in the buffer memory 217.

A method, performed by the file system, of adding fields to a write command and a method, performed by the storage system 200, of identifying field values of a write command and performing a particular operation may be defined by a communication protocol between the host system 100 and the storage system 200. The communication protocol may be set or changed by the host system 100.

Although not shown in FIG. 3, a write command may further include a field including other various kinds of information related to a write operation.

Figure 4:
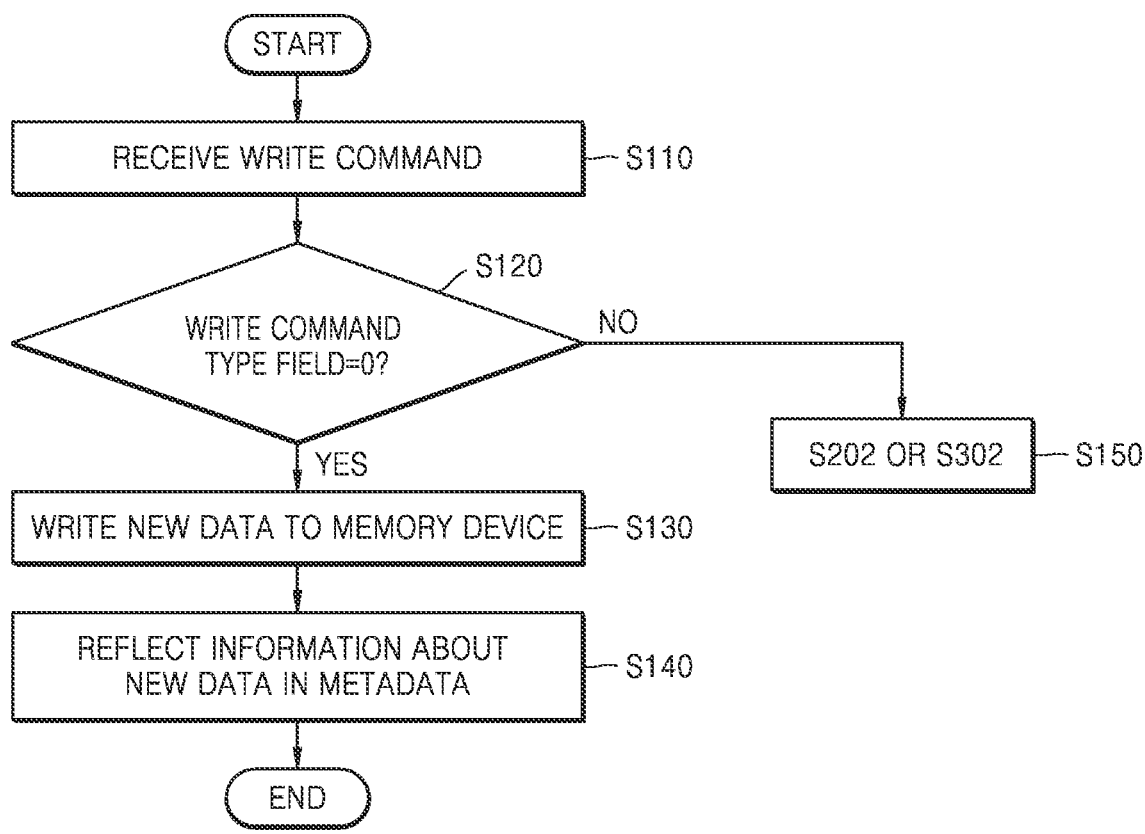
FIG. 4 is a flowchart summarizing a data write operation that may be used in a data processing system according to embodiments of the inventive concept.

FIG. 4 is a flowchart summarizing in one example a data write operation that may be performed by a data processing system according to embodiments of the inventive concept.

Referring to FIGS. 1, 2, 3 and 4, the operation of the storage system 200 may be determined according to value(s) of particular field(s) associated with a defined write command. Here, for example, the host system 100 may transmit information about new data and information about old data corresponding to the new data to the storage system 200 together with a write command In some embodiments, a write command may be generated to request that the storage system 200 write new data, or to request that the storage system 200 to write new data and invalidate old data. To distinguish these two types of write commands from each other, the fifth field (i.e., the write command type field) in FIG. 3 may be used.

Referring to the flowchart of FIG. 4 in the context of the exemplary configurations of FIGS. 1, 2 and 3, the storage system 200 may receive a write command from the host system 100 (S110), and the memory controller 210 of the storage system 200 may determine whether the value of the fifth field (i.e., the write command type field) is 0 (S120).

Here, as described above with reference to FIG. 3, when the value of the fifth field (i.e., the write command type field) is 0, the write command may be a conventional write command for new data, but when the value of the fifth field (i.e., the write command type field) is 1, the write command may be a command to write new data and invalidate old data.

Accordingly, when the value of the fifth field (i.e., the write command type field) is 0 (S120=YES), the memory controller 210 may write new data corresponding to the write command to the memory device 220 (S130). Thereafter, the memory controller 210 may update the metadata 218 by reflecting information about new data in the metadata 218 (S140), wherein the information about new data is included in the write command.

Figure 6:
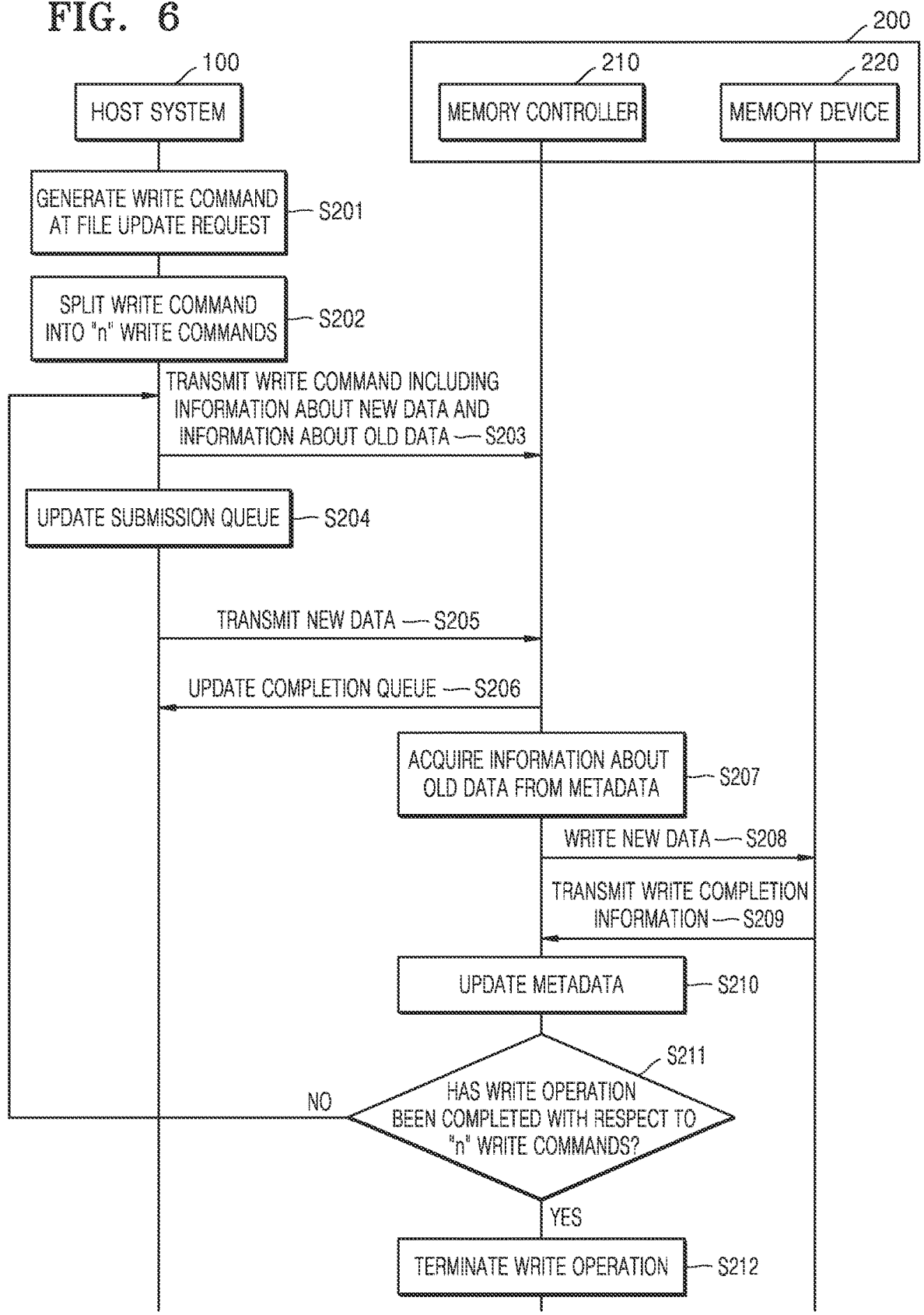
FIGS. 6 and 7 are flowcharts summarizing an overwrite operation that may be used in a data processing system according to embodiments of the inventive concept.
Figure 7:
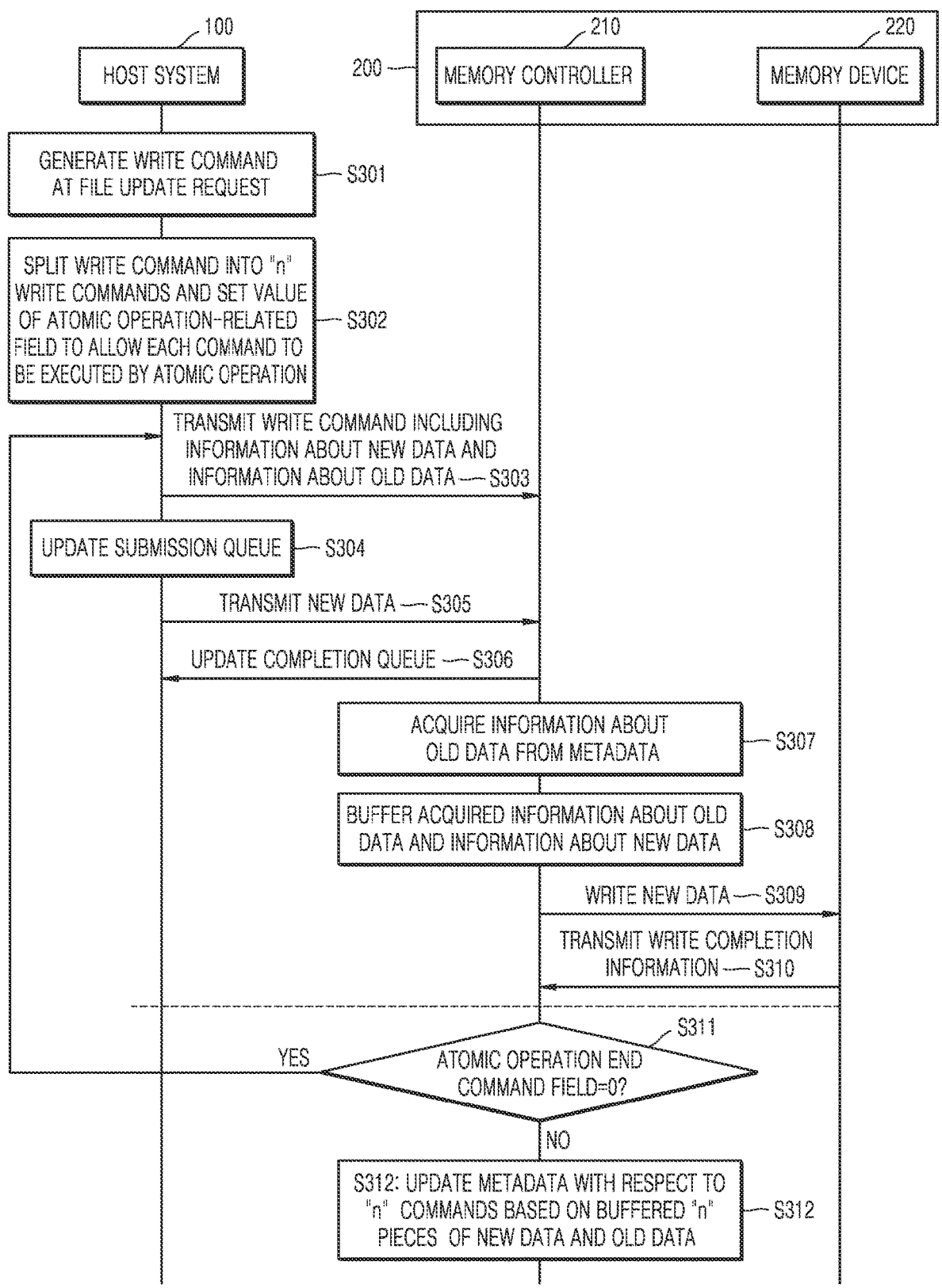

Alternately, when the value of the fifth field (i.e., the write command type field) is 1 (S120=NO), the memory controller 210 may perform either operation S202 described hereafter in relation to FIG. 6, or operation S302 described hereafter in relation to FIG. 7.

Figure 5:
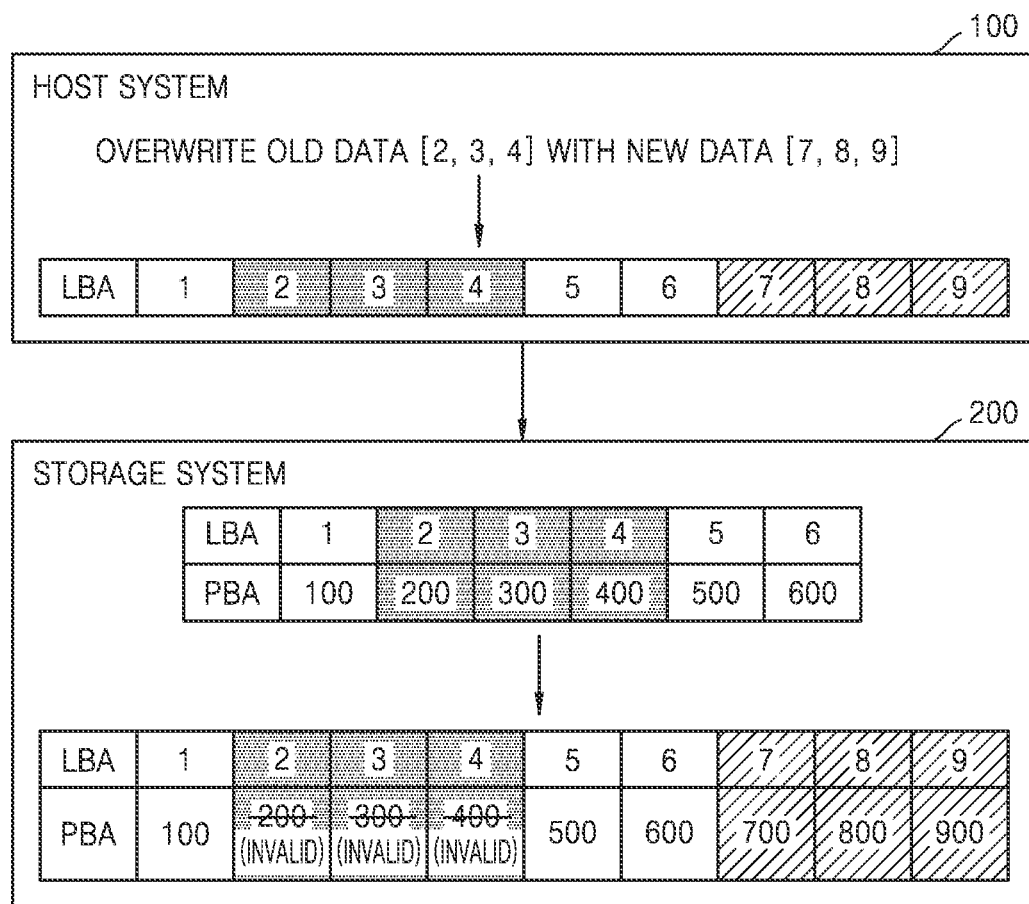
FIGS. 5 and 8 are respective conceptual diagrams illustrating operative examples of a data processing system according to embodiments of the inventive concept.

FIG. 5 is a conceptual diagram illustrating in one example operation of a data processing system according to embodiments of the inventive concept.

In the context of FIGS. 1, 2 and 3, the host system 100 may generate a write command having 1 as the value of the fifth field (i.e., the write command type field) at a file update request and transmit an overwrite request to the storage system 200 through the write command.

Referring to FIGS. 1, 2, 3 and 5, when an overwrite request for a file is generated in the host system 100, the file system may generate a command to write new data and invalidate old data that has been written before. When the file system is an LFS, the new data is not written to the logical address of the old data, but instead, to a new logical address. For example, it is assumed that logical addresses of the old data are LBA 2 through LBA 4, and logical addresses of the new data are LBA 7 through LBA 9.

Before the write command is received, the metadata 218 in the storage system 200 may include a mapping table showing a mapping relationship between logical addresses LBA 1 through LBA 6 and physical addresses PBA 100 through PBA 600. The host system 100 may transmit information including the logical addresses LBA 7 through LBA 9 of the new data and information including the logical addresses LBA 2 through LBA 4 of the old data to the storage system 200 together with the write command. The storage system 200 may determine addresses of writable areas in the memory device 220 to write the new data. For example, physical addresses PBA 700 through PBA 900 may correspond to writable areas on which erasure has been completed.

Thereafter, the storage system 200 may write the new data to the physical addresses PBA 700 through PBA 900 and write the physical addresses PBA 700 through PBA 900, to which the new data has been written, to the mapping table to map the logical addresses of the new data to the physical addresses of the new data.

The storage system 200 may identify the physical addresses PBA 200 through PBA 400 mapped to the logical addresses LBA 2 through LBA 4 of the old data based on the mapping table. Thereafter, the storage system 200 may erase the mapping relationship between the physical addresses PBA 200 through PBA 400 and the logical addresses LBA 2 through LBA 4 to invalidate the old data. The old data may be invalidated in various ways. For example, the physical addresses PBA 200 through PBA 400 may be erased from the mapping table. Alternatively, information indicating whether each logical address is valid may be included in the mapping table, and the old data may be invalidated by changing the information indicating validity. After the procedure described above is performed, the mapping table may include information validly mapping the logical addresses LBA 7 through LBA 9 to the physical addresses PBA 700 through PBA 900 with respect to the new data.

FIGS. 6 and 7 are respective flowcharts summarizing overwrite operations that may be performed by data processing systems according to embodiments of the inventive concept.

FIG. 6 is a flowchart summarizing an overwriting method for a data processing system including the storage system 200 that does not support an atomic write. Referring to FIGS. 1, 2, 3 and 6, the metadata manager 214 may update the metadata 218 each time when an overwrite is processed in response to an overwrite request.

When a file update request is generated in the host system 100, the host system 100 may generate a write command (S201). The host system 100 may acquire information about old data corresponding to new data to be written, using meta information included in the file system. The host system 100 may generate the write command including the information about the old data. For example, the write command may include the fields in FIG. 3.

When the size of information about the new data to be written or the size of the information about the old data exceeds a reference value, the file system may split the write command to be transmitted to the storage system 200 into "n" write commands (S202).

The host system 100 may transmit one of the "n" write commands to the memory controller 210 (S203). For example, the write command may include an address of the new data and an address of the old data and may further include the size of the new data and the size of the old data. At this time, the address of the new data and the address of the old data may be logical addresses managed by the file system.

For example, the write command may further include a field indicating whether the storage system 200 supports an atomic write or whether the write command corresponds to an atomic write.

The host system 100 may store the write command in a submission queue (S204).

For example, the write command may be stored in the submission queue until the write command is executed by the storage system 200. In addition, the "n" write commands may be stored in the submission queue.

The host system 100 may transmit the new data to the storage system 200 (S205). For example, the host system 100 may use a special data transmitter. The data transmitter may perform a direct memory access (DMA).

The storage system 200 may update a completion queue of the host system 100 (S206). For example, when the storage system 200 transmits command execution completion information, which indicates that execution of the write command is completed, to the host system 100, the command execution completion information may be stored in the completion queue of the host system 100. When the command execution completion information is stored in the completion queue, the command corresponding to the command execution completion information may be erased from the submission queue.

The memory controller 210 may acquire the information about the old data from the metadata 218 (S207). For example, a physical address of the old data may be acquired using a mapping table based on the logical address of the old data, which is received from the host system 100. The received information may be stored in the buffer memory 217.

The memory controller 210 may write the new data to the memory device 220 (S208).

The memory device 220 may transmit write completion information to the memory controller 210 (S209).

The memory controller 210 may update the metadata 218 using the information about the new data, the information about the old data, and the acquired physical address of the old data (S210). For example, the memory controller 210 may map and write the logical address of the new data and a physical address of the new data to the mapping table and invalidate the old data.

The data processing system 10 may perform operations S203 through S210 with respect to each of the "n" write commands That is, the memory controller 210 may receive information about new data and information about old data from the host system 100, write the new data to the memory device 220, and update the mapping table by mapping a physical address, to which the new data has written, to a logical address of the new data. The memory controller 210 may identify a logical address of the old data based on the mapping table and invalidate the old data by erasing a physical address mapped to the logical address of the old data.

The storage system 200 may determine whether writing of new data is completed with respect to all of the "n" write commands (S211). Once the write operation is completed with respect to all of the "n" write commands (S211=YES), the storage system 200 may terminate the write operation (S212). When the write operation has not been performed with respect to all of the "n" write commands, the overwriting method proceeds to operation S203.

FIG. 7 is a flowchart summarizing an overwriting method for the data processing system 10 including the storage system 200 that supports an atomic write. Referring to FIGS. 1, 2, 3 and 7, the metadata manager 214 may buffer information about new data or information about old data through overwrites and may update the metadata 218 with the buffered information.

When a file update request is generated, the host system 100 may generate a write command (S301).

Here, the file system may split the write command into "n" write commands and, to allow each write command to be executed by an atomic operation, may set a field related to the atomic operation (S302). When the storage system 200 supports the atomic operation, the file system may add, to each write command, a field indicating that the write command is executed by an atomic write. A plurality of fields may be added and may include the sixth field (i.e., the atomic operation field) and the seventh field (i.e., the atomic operation end command field) in FIG. 3.

Operations S303 through S307 may be respectively and substantially the same as operations S203 through S207 of FIG. 6.

The memory controller 210 may buffer information including a physical address of old data and information about new data in the buffer memory 217 (S308). In contrast to the method of FIG. 6, the memory controller 210 may temporarily store a logical address of the new data and a logical address of the old data, which have been received (S303) in the buffer memory 217 instead of immediately updating the metadata 218 with the logical addresses. The buffered information may be reflected in the metadata 218 (S312).

Operations S309 and S310 may be respectively and substantially the same as operations S208 and S209 of FIG. 6. The memory controller 210 may write the new data to the memory device 220 and receive write completion information from the memory device 220.

After a write operation of the storage system 200 is performed, the memory controller 210 may determine the value of the seventh field (i.e., the atomic operation end command field) among atomic operation-related fields in the write command (S311). In an example embodiment, when the value of the seventh field is 0, the memory controller 210 may sequentially receive another one of the "n" write commands. When the value of the seventh field is 1, the memory controller 210 may update the metadata 218 based on buffered data.

In the embodiment of FIG. 7, a sudden power-off (SPO) may occur after operation S310. For example, in a state where a write command is split into four write commands, an SPO may occur after writing of first, second and third partial data is completed and before the fourth write command is received.

In this case, the first, second and third partial data has been written to the memory device 220, fourth data has not been written to the memory device 220, and information about the first through fourth data has not been reflected to the metadata 218. That is, if power supply to the storage system 200 is interrupted due to an SPO, information about the first through third, which has been buffered in the buffer memory 217, may be erased, and the metadata 218 may remain in a state before the first write command is received.

That is, as a result of an atomic operation, data integrity is ensured so that a file may be updated and the states of new data and old data may all be reflected in the metadata 218 or a file update may stop and the metadata 218 may be maintained in a state before the file update.

If a write operation of the data processing system 10 is not performed by an atomic operation, new data corresponding to the first through third data and old data corresponding to the fourth data may be included in the metadata 218. In this case, the metadata 218 is not consistent with metadata of the file system of the host system 100, which may cause an error in the operation. In addition, a procedure for recovering a corrupt file is required, which may decrease efficiency.

The cases where a write command has a large data size have been described with reference to FIGS. 6 and 7. When the write command has a data size smaller than a certain reference value, a file update may be performed with transmission of only one write command. When a file update is performed with a single command, the operation of FIG. 6 or FIG. 7 may ensure atomicity.

Figure 8:
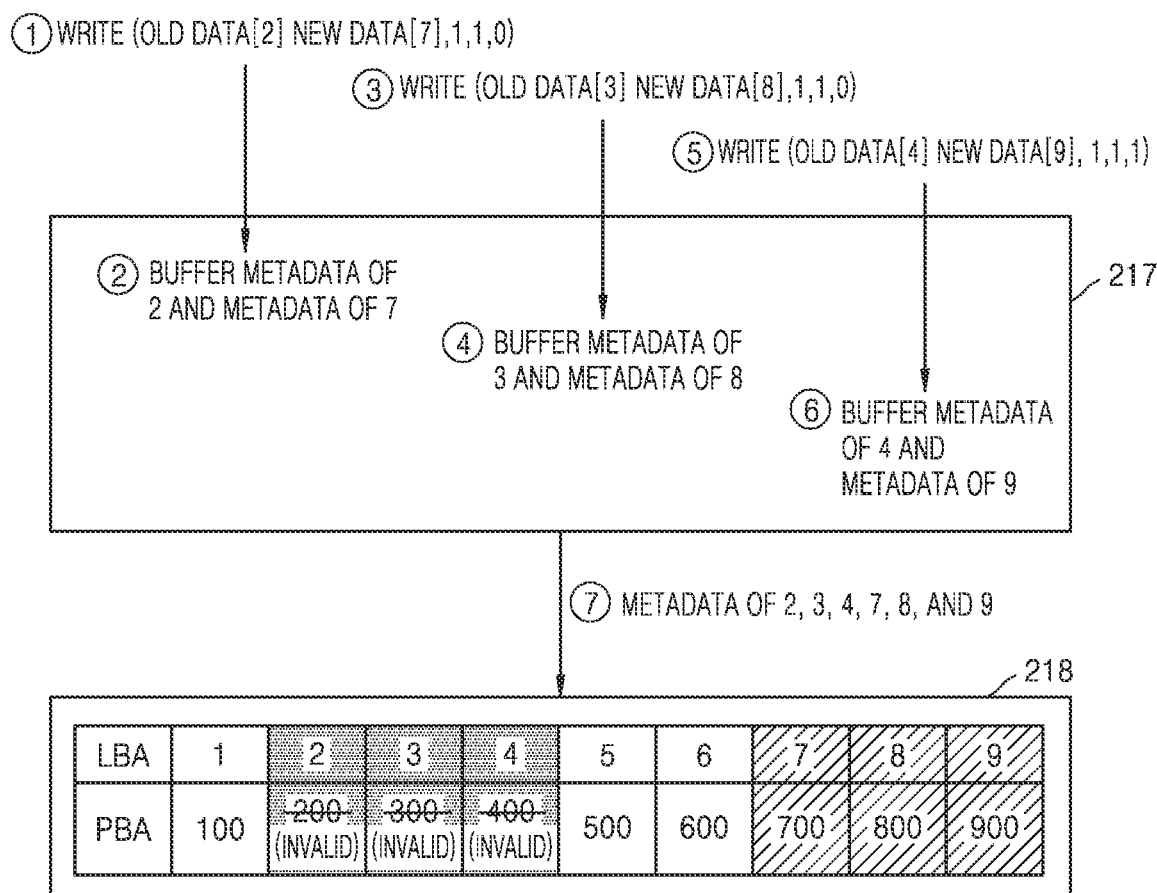

FIG. 8 is a conceptual diagram illustrating in one example a overwrite operation for a data processing system according to embodiments of the inventive concept.

Referring to FIGS. 1, 2, 3 and 8, when data included in a write command is large, the write command may be split into a plurality of write commands by the file system. For example, when the size of data included in an overwrite request is 12 KB, a write command may be split into three 4-KB write commands.

Hereinafter, the case of the method of FIG. 7, in which the storage system 200 supports atomic write operation and the host system 100 sets such that an overwrite is performed as an atomic operation, is assumed in the description below. For convenience of description, the values of a field indicating the size of old data and a field indicating the size of new data among data fields of a write command may be omitted.

The file system may sequentially transmit three write commands to the storage system 200. When a first write command is received, the memory controller 210 may determine the values of the sixth field (i.e., the atomic operation field) and the seventh field (i.e., the atomic operation end command field) of the first write command Because the value of the sixth field (i.e., the atomic operation field) of the first write command is 1 and the value of the seventh field (i.e., the atomic operation end command field) of the first write command is 0, the memory controller 210 writes new data, which has a logical address LBA 7 included in the first write command, to the memory device 220 and buffers information about old data having a logical address LBA 2 and information about the new data in the buffer memory 217.

Because the value of the sixth field (i.e., the atomic operation field) of the second write command is 1 and the value of the seventh field (i.e., the atomic operation end command field) of the second write command is 0, the memory controller 210 writes new data having a logical address LBA 8 to the memory device 220 and then buffers information about the new data and information about old data having a logical address LBA 3 in the buffer memory 217.

After determining that the value of the sixth field (i.e., the atomic operation field) of the third write command is 1 and the value of the seventh field (i.e., the atomic operation end command field) of the third write command is 1, the memory controller 210 writes new data having a logical address LBA 9 to the memory device 220, buffers information about the new data and information about old data having a logical address LBA 4 in the buffer memory 217, and updates the metadata 218 based on the buffered information corresponding to LBA 2, LBA 3, LBA 4, LBA 7, LBA 8, and LBA 9.

In some embodiments, because invalidation of old data and a write operation are simultaneously performed at the time of a file update, the file system does not need to separately transmit a trim command in order to invalidate the old data. In addition, because unnecessary data is invalidated during a write operation before an update, the storage system 200 may more efficiently perform garbage collection operation(s). Furthermore, because an update of the metadata 218 in the storage system 200 may be performed by an atomic operation, data corruption may be prevented even in an unexpected event such as an SPO.

Figure 9:
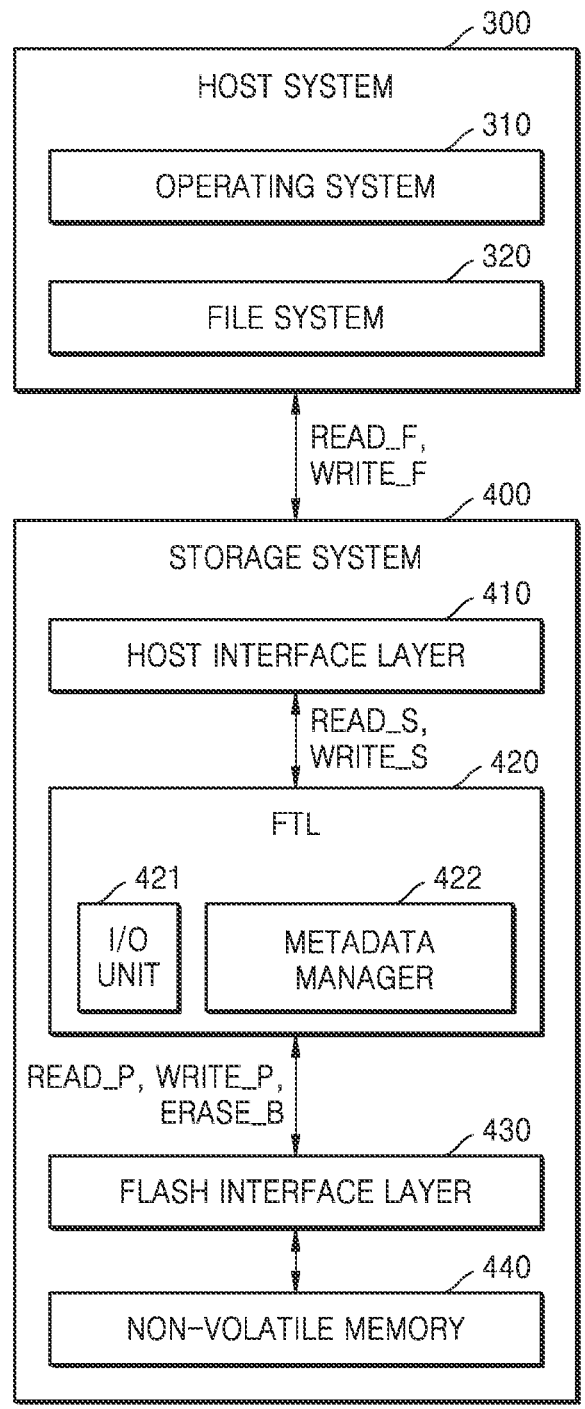
FIG. 9 is a block diagram illustrating a data processing system according to embodiments of the inventive concept.

FIG. 9 is a block diagram illustrating a data processing system according to embodiments of the inventive concept.

Referring to FIG. 9, a host system 300 and a storage system 400 may form a data processing system 20. Here, the data processing system 20 may form a computer, an ultramobile personal computer (UMPC), a workstation, a netbook, a personal digital assistant (PDA), a portable computer, a web tablet, a tablet computer, a wireless phone, a mobile phone, a smart phone, an e-book, a portable multimedia player (PMP), a handheld game console, a navigation device, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage forming a data center, a device transmitting and receiving information in a wireless environment, one of various electronic devices forming a home network, one of various electronic devices forming a computer network, one of various electronic devices forming a telematics network, a radio frequency identification (RFID) device, or one of various components forming a computing system.

The host system 300 may include at least one operating system 310, wherein the operating system 310 generally manages and controls the operation of the host system 300 and the interaction between the host system 300 and a user of the memory system 20.

In this regard, the operating system 310 will support function(s) and/or operation(s) indicated by a user's operation of the host system, for example. Here, the operating system 310 may be classified as a normal operating system and a mobile operating system according to the mobility aspect(s) of the host system 300. The normal operating system may be classified into a personal operating system and a business operating system according to a user's use environment. For example, the personal operating system may be characterized to support a function of providing services for general users and may include Windows and Chrome. The business operating system may be characterized to ensure and support high performance and may include Windows Server, Linux, and Unix.

The mobile operating system may be characterized to support a mobile service providing function and a system power saving function and may include Android, iOS, and Windows Mobile. In some embodiments, a host system 300 may include a plurality of operating systems 310 and may execute the operating systems 310 to perform operations in association with the storage system 400 in response to a user request. Here, the host system 300 may transmit commands corresponding to user request(s) to the storage system 400, and the storage system 400 may perform operation(s) responsive to the command(s)—that is, operations corresponding to the user request.

The host system 300 may include a file system 320. The file system 320 refers to a data structure for storing a file in the storage system 400 connected to the host system 300.

A read or write request of the host system 300 may be executed in units of files. In other words, through a file read request READ_F or a file write request WRITE_F, data from the host system 300 may be written to the storage system 400 or data stored in the storage system 400 may be read to the host system 300.

For example, the storage system 400 may be implemented as a personal computer (PC), a data server, a network-attached storage (NAS), an Internet of things (IoT) device, or a portable electronic device. The portable electronic device may include a laptop computer, a mobile phone, a smart phone, a tablet PC, a PDA, an enterprise digital assistant (EDA), a digital still camera, a digital video camera, an audio device, a PMP, a personal navigation device (PND), an MP3 player, a handheld game console, an e-book, or a wearable device.

The storage system 400 may include a host interface layer 410, an FTL 420, a flash interface layer 430, and a non-volatile memory 440.

The host interface layer 410 may be a logical area, in which interfacing between the host system 300 and the storage system 400 occurs.

The FTL 420 may have a different form than the FTL 213 of FIG. 2. For example, an input/output (I/O) unit 421 may receive data to be written and a logical address, e.g., an LBA, of the data in response to the file write request WRITE_F and may provide a physical address, e.g., a PBA, corresponding to the LBA to the non-volatile memory 440 based on the mapping table stored in the RAM 212 or the ROM 215 in FIG. 2.

In some embodiments, the I/O unit 421 may receive a logical address of new data and a logical address of old data and provide a physical address of the new data to the non-volatile memory 440, wherein the physical address of the new data results from translation based on the mapping table.

A metadata manager 422 may buffer information about new data and information about old data, which are received from the I/O unit 421, in a cache memory and may update the metadata 218 with the buffered information when information included in the file write request WRITE_F satisfies a certain reference. The metadata manager 422 may be considered as the metadata manager 214 of FIG. 2.

The host interface layer 410 and the FTL 420 may write or read data sector by sector. That is, in response to the read or write request of the host system 300, the host interface layer 410 may send a sector read request READ_S or a sector write request WRITE_S to the FTL 420 with respect to each sector.

The flash interface layer 430 may provide an interface between the FTL 420 and the non-volatile memory 440. In some embodiments, data may be read or written page by page in response to a page read request READ_P or a page write request WRITE_P and may be erased block by block in response to a block erase request ERASE_B, which may be a characteristic of a flash memory device.

The non-volatile memory 440 may be considered as the memory device 220 in FIG. 1, and thus redundant description thereof is omitted.

In some embodiments, the data processing system 20 may be mounted using various types of packages. For example, the data processing system 20 may be mounted in a form of a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated circuit (SOIC), a shrink small outline package (SSOP), a thin small outline package (TSOP), a system in package (SIP), or a multi-chip package.

Figure 10:
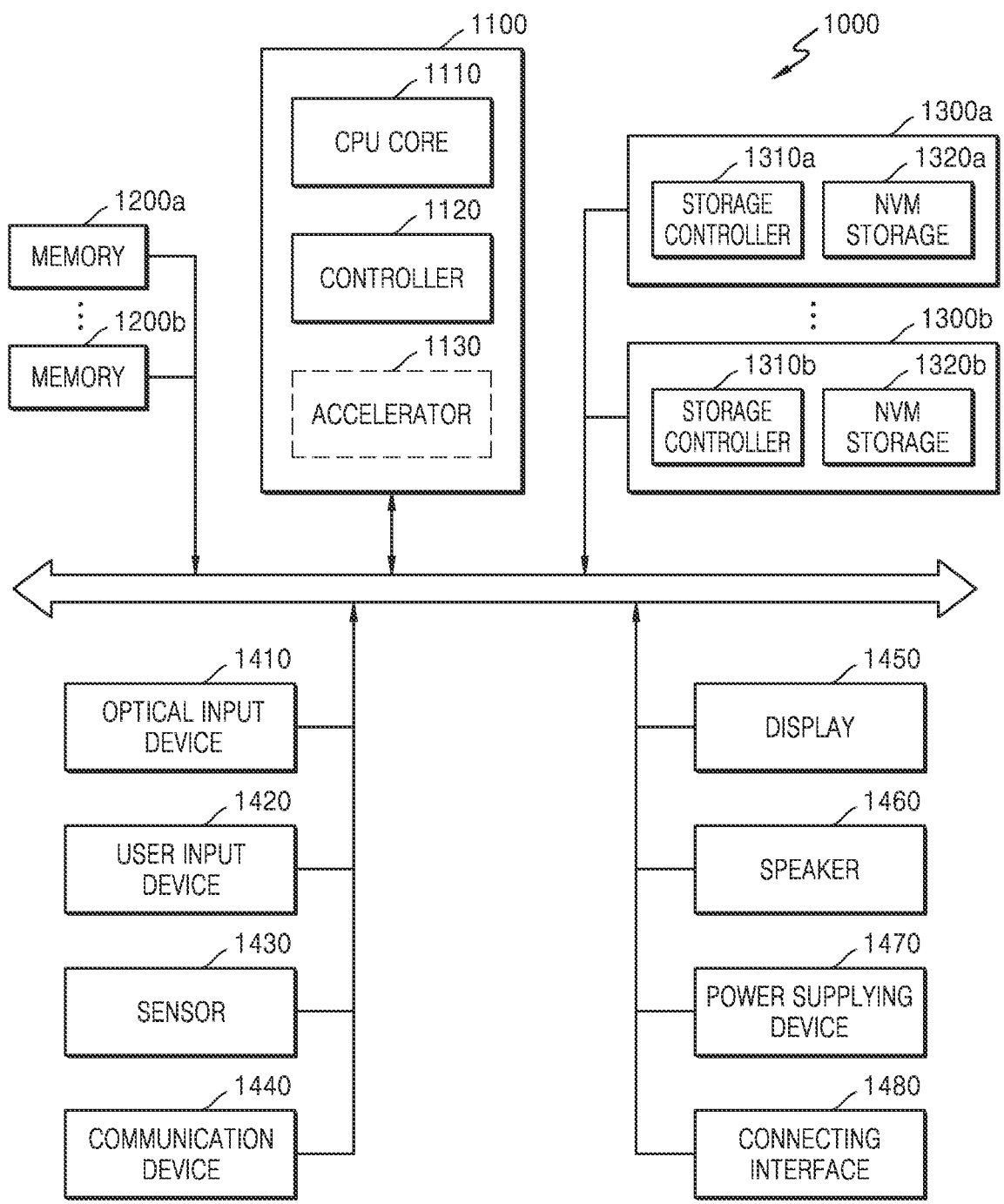
FIG. 10 is a block diagram illustrating a system using a storage device according to embodiments of the inventive concept.

FIG. 10 is a block diagram illustrating a system 1000 using a storage device according to embodiments of the inventive concept.

The system 1000 may include a mobile system such as a mobile phone, a smart phone, a tablet PC, a wearable device, a health care device, or an IoT device. However, the system 1000 is not limited to a mobile system and may include a PC, a laptop computer, a server, a media player, or an automotive device such as a navigation device.

Referring to FIG. 10, the system 1000 may include a main processor 1100, memories 1200a and 1200b, and storage devices 1300a and 1300b and may further include at least one selected from an optical input device 1410, a user input device 1420, a sensor 1430, a communication device 1440, a display 1450, a speaker 1460, a power supplying device 1470, and a connecting interface 1480.

The main processor 1100 may generally control operations of the system 1000, and more particularly, control operations of other elements of the system 1000. The main processor 1100 may be implemented as a general-purpose processor, a dedicated processor, or an application processor.

The main processor 1100 may include at least one central processing unit (CPU) core 1110 and may further include a controller 1120 controlling the memories 1200a and 1200b and/or the storage devices 1300a and 1300b. According to embodiments, the main processor 1100 may further include an accelerator 1130, which is a dedicated circuit for high-speed data operations such as artificial intelligence (AI) data operations. The accelerator 1130 may include a graphics processing unit (GPU), a neural processing unit (NPU), and/or a data processing unit (DPU) and may be implemented in a separate chip physically independent from other elements of the main processor 1100.

The main processor 1100 may perform the operations of the host systems 100 and 300 described with reference to FIGS. 1 through 9.

The memories 1200a and 1200b may be used as a main memory device of the system 1000 and may include volatile memory such as static RAM (SRAM) and/or DRAM or non-volatile memory such as flash memory, PRAM, and/or RRAM. The memories 1200a and 1200b may be implemented in the same package as the main processor 1100.

The storage devices 1300a and 1300b may include a non-volatile storage device that retains data regardless of power supply and may have a larger capacity than the memories 1200a and 1200b. The storage devices 1300a and 1300b may include storage controllers 1310a and 1310b, respectively, and non-volatile memory (NVM) storages 1320a and 1320b, respectively. The NVM storage 1320a stores data under the control of the storage controller 1310a, and the NVM storage 1320b stores data under the control of the storage controller 1310b. The NVM storages 1320a and 1320b may include 2D or 3D VNAND flash memory or other types of NVM such as PRAM and/or RRAM.

The storage devices 1300a and 1300b may be physically separated from the main processor 1100 in the system 1000 or may be implemented in the same package as the main processor 1100. The storage devices 1300a and 1300b may have a form of a memory card and may thus be removably coupled to other elements of the system 1000 through an interface such as the connecting interface 1480, which will be described below. The storage devices 1300a and 1300b may include a device, to which a protocol such as a UFS standard is applied, but are not limited thereto.

The storage devices 1300a and 1300b may perform the operations of the storage systems 200 and 400 described above with reference to FIGS. 1 through 9.

The optical input device 1410 may capture a still image or a moving image and may include a camera, a camcorder, and/or a webcam.

The user input device 1420 may receive various types of data input by a user of the system 1000 and may include a touch pad, a key pad, a keyboard, a mouse, and/or a microphone.

The sensor 1430 may sense various types of physical quantities that may be acquired from outside the system 1000 and may convert sensed physical quantities into electrical signals. The sensor 1430 may include a temperature sensor, a pressure sensor, an illuminance sensor, a position sensor, an acceleration sensor, a biosensor, and/or a gyroscope.

The communication device 1440 may transmit or receive signals to or from other devices outside the system 1000 according to various communication protocols. The communication device 1440 may include an antenna, a transceiver, and/or a modem.

The display 1450 and the speaker 1460 may function as output devices that respectively output visual information and auditory information to the user of the system 1000.

The power supplying device 1470 may appropriately transform power from a battery (not shown) embedded in the system 1000 and/or an external power supply and may supply transformed power to each element of the system 1000.

The connecting interface 1480 may provide a connection between the system 1000 and an external device, which is connected to the system 1000 and may exchange data with the system 1000. The connecting interface 1480 may include various interfaces such as an ATA interface, a SATA interface, an external SATA (e-SATA) interface, an SCSI, a SAS, a PCI interface, a PCI express (PCIe) interface, an NVM express (NVMe) interface, Institute of Electrical and Electronics Engineers (IEEE) 1394, a USB interface, an SD card interface, an MMC interface, an eMMC interface, a UFS interface, an embedded UFS (eUFS) interface, and a CF card interface.

Figure 11:
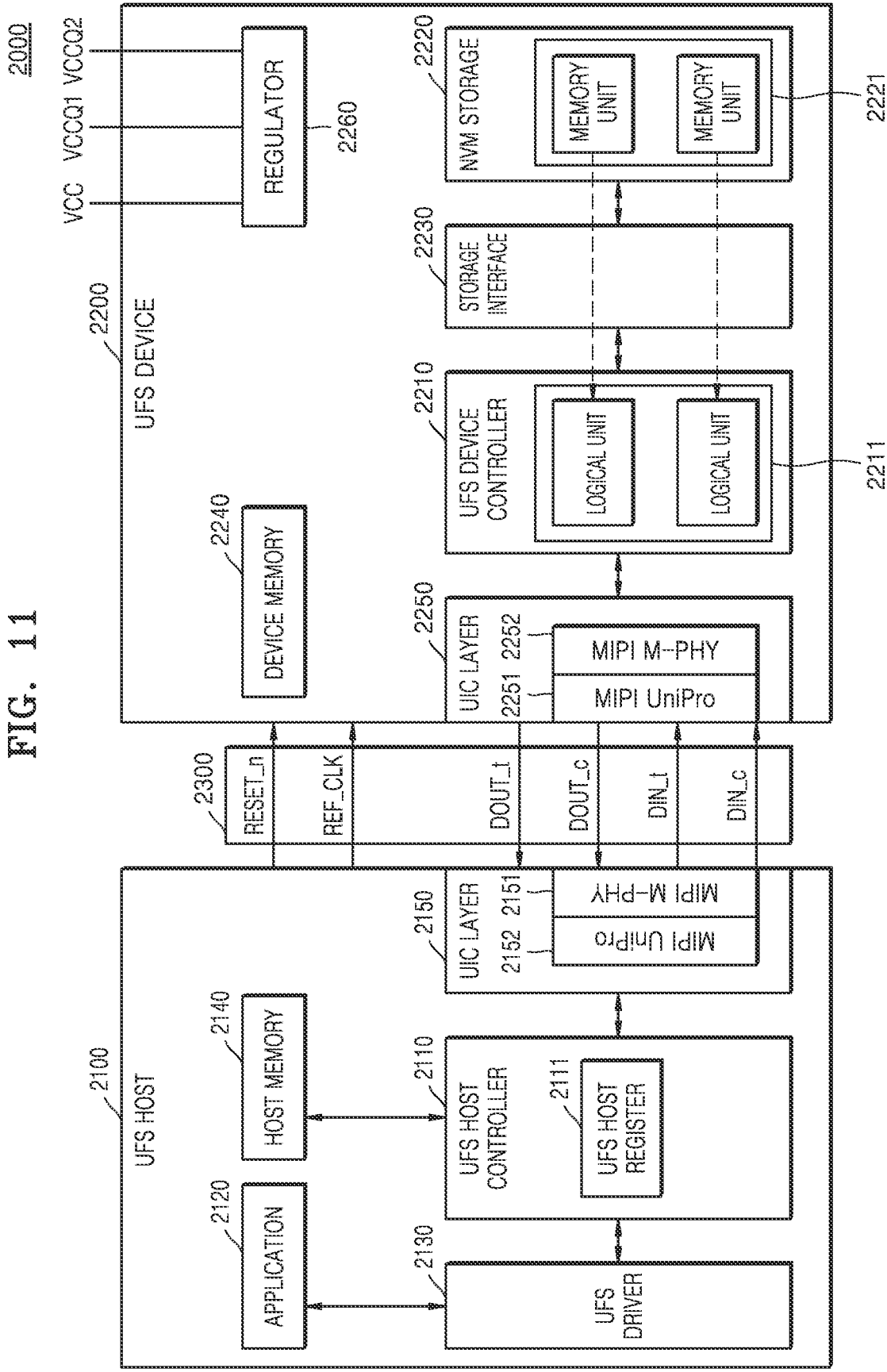
FIG. 11 is a block diagram illustrating a universal flash storage (UFS) system according to embodiments of the inventive concept.

FIG. 11 is a block diagram illustrating a UFS system 2000 according to embodiments of the inventive concept.

Here, it is assumed that the UFS system 2000 complies with one or more technical standards published by Joint Electron Device Engineering Council (JEDEC) and may include a UFS host 2100, a UFS device 2200, and a UFS interface 2300. The descriptions given above about the system 1000 of FIG. 10 may also be applied to the UFS system 2000 of FIG. 11 unless the descriptions contradict descriptions given below with reference to FIG. 11.

Referring to FIG. 11, the UFS host 2100 and the UFS device 2200 may be connected to each other through the UFS interface 2300. When the main processor 1100 in FIG. 10 is an application processor, the UFS host 2100 may be implemented as a part of the application processor. A UFS host controller 2110 may correspond to the controller 1120 of the main processor 1100 in FIG. 10, and a host memory 2140 may correspond to the memories 1200a and 1200b in FIG. 10. The UFS device 2200 may correspond to the storage devices 1300a and 1300b in FIG. 10. A UFS device controller 2210 may correspond to the storage controllers 1310a and 1310b in FIG. 10. An NVM storage 2220 may correspond to the NVM storages 1320a and 1320b in FIG. 10.

The UFS host 2100 may perform the operations of the host systems 100 and 300 described with reference to FIGS. 1 through 9, and the UFS device 2200 may perform operations of the storage systems 200 and 400.

The UFS host 2100 may include the UFS host controller 2110, an application 2120, a UFS driver 2130, a host memory 2140, and a UFS interconnect (UIC) layer 2150. The UFS device 2200 may include the UFS device controller 2210, the NVM storage 2220, a storage interface 2230, a device memory 2240, a UIC layer 2250, and a regulator 2260. The NVM storage 2220 may include a plurality of memory units 2221. The memory unit 2221 may include VNAND flash memory in a 2D or 3D structure or other kinds of NVM such as PRAM and/or RRAM. The UFS device controller 2210 and the NVM storage 2220 may be connected to each other through the storage interface 2230. The storage interface 2230 may be implemented to comply with a standard protocol such as Toggle or ONFI.

The application 2120 may refer to a program for communicating with the UFS device 2200 to use a function of the UFS device 2200. The application 2120 may transmit an input-output request (IOR) for input/output of the UFS device 2200 to the UFS driver 2130. The IOR may include a data read request, a data write request, and/or a data discard request but is not limited thereto.

The UFS driver 2130 may manage the UFS host controller 2110 through a UFS-host controller interface (HCI). The UFS driver 2130 may convert an IOR, which is generated by the application 2120, into a UFS command defined by a UFS standard and may transmit the UFS command to the UFS host controller 2110. A single IOR may be converted into a plurality of UFS commands A UFS command may be a command that is defined by the SCSI standard or an exclusive command for the UFS standard.

The UFS host controller 2110 may transmit the UFS command from the UFS driver 2130 to the UIC layer 2250 of the UFS device 2200 through the UIC layer 2150 and the UFS interface 2300. In this process, a UFS host register 2111 of the UFS host controller 2110 may function as a command queue.

The UIC layer 2150 of the UFS host 2100 may include a MIPI M-PHY 2151 and a MIPI UniPro 2152, and the UIC layer 2250 of the UFS device 2200 may also include a MIPI M-PHY 2252 and a MIPI UniPro 2251.

The UFS interface 2300 may include a line transmitting a reference clock signal REF_CLK, a line transmitting a hardware reset signal RESET_n for the UFS device 2200, a pair of lines transmitting a pair of differential input signals DIN_t and DIN_c, and a pair of lines transmitting a pair of differential output signals DOUT_t and DOUT_c.

The frequency value of the reference clock signal REF_CLK provided from the UFS host 2100 to the UFS device 2200 may be one of 19.2 MHz, 26 MHz, 38.4 MHz, and 52 MHz but is not limited thereto. The UFS host 2100 may change the frequency value of the reference clock signal REF_CLK even while operating or exchanging data with the UFS device 2200. The UFS device 2200 may generate clock signals having different frequencies from the reference clock signal REF_CLK, which is received from the UFS host 2100, using a phase-locked loop (PLL) or the like. The UFS host 2100 may set a value of a data rate between the UFS host 2100 and the UFS device 2200 using the frequency value of the reference clock signal REF_CLK. In other words, the value of the data rate may be determined depending on the frequency value of the reference clock signal REF_CLK.

The UFS interface 2300 may support multiple lanes, and each of the lanes may be implemented as a differential pair. For example, the UFS interface 2300 may include at least one receive lane and at least one transmit lane. In FIG. 11, a pair of lines transmitting the pair of differential input signals DIN_t and DIN_c may form a receive lane, and a pair of lines transmitting the pair of differential output signals DOUT_t and DOUT_c may form a transmit lane. Although one transmit lane and one receive lane are illustrated in FIG. 11, the numbers of transmit lanes and receive lanes may be changed.

A receive lane and a transmit lane may transmit data in a serial communication mode.

Because the receive lane is separated from the transmit lane, the UFS host 2100 may communicate with the UFS device 2200 in a full-duplex mode. In other words, the UFS device 2200 may transmit data to the UFS host 2100 through the transmit lane even while receiving data from the UFS host 2100 through the receive lane. Control data such as a command from the UFS host 2100 to the UFS device 2200 may be transmitted through the same lane as user data, which the UFS host 2100 writes to or reads from the NVM storage 2220 of the UFS device 2200. Accordingly, other lanes for data transmission than a pair of a receive lane and a transmit lane are not necessary between the UFS host 2100 and the UFS device 2200.

The UFS device controller 2210 of the UFS device 2200 may generally control operations of the UFS device 2200. The UFS device controller 2210 may manage the NVM storage 2220 using a logical unit 2211 corresponding to a logical data storage unit. The number of logical units 2211 may be eight but is not limited thereto. The UFS device controller 2210 may include an FTL and may translate a logical address data, e.g., an LBA, received from the UFS host 2100 into a physical data address, e.g., a PBA, using address mapping information of the FTL. A logical block for storing user data in the UFS system 2000 may have a size in a certain range. For example, a minimum size of a logical block may be set to 4 Kbytes.

The UFS device controller 2210 may correspond to the memory controller 210 of the storage system 200 in FIG. 1.

When a command from the UFS host 2100 is input to the UFS device 2200 through the UIC layer 2250, the UFS device controller 2210 may perform an operation corresponding to the command and transmit a completion response to the UFS host 2100 after the operation is completed.

For example, when the UFS host 2100 writes user data in the UFS device 2200, the UFS host 2100 may transmit a data write command to the UFS device 2200. When the UFS host 2100 receives a response corresponding to ready-to-transfer from the UFS device 2200, the UFS host 2100 may transmit the user data to the UFS device 2200. The UFS device controller 2210 may temporarily store the user data in the device memory 2240 and write the user data temporarily stored in the device memory 2240 to a selected position of the NVM storage 2220.

For example, when the UFS host 2100 reads user data from the UFS device 2200, the UFS host 2100 may transmit a data read command to the UFS device 2200. The UFS device controller 2210 may receive the data read command, read the user data from the NVM storage 2220 based on the data read command, and temporarily store the user data, which has been read, in the device memory 2240. In this read operation, the UFS device controller 2210 may detect and correct an error in the user data, which has been read, using an embedded error correction code (ECC) circuit (not shown). The UFS device controller 2210 may transmit the user data, which has been temporarily stored in the device memory 2240, to the UFS host 2100. The UFS device controller 2210 may further include an advanced encryption standard (AES) circuit (not shown). The AES circuit may encrypt or decrypt data input to the UFS device controller 2210 using a symmetric-key algorithm.

The UFS host 2100 may store commands to be transmitted to the UFS device 2200 in the UFS host register 2111, which may function as a command queue, in order and transmit the commands to the UFS device 2200 in the order. At this time, even while a command transmitted to the UFS device 2200 is being processed by the UFS device 2200, i.e., even before the UFS host 2100 is notified that a command transmitted to the UFS device 2200 has been completely processed by the UFS device 2200, the UFS host 2100 may transmit a subsequent command in the command queue to the UFS device 2200, and the UFS device 2200 may receive the subsequent command from the UFS host 2100 even while processing the command received before. Queue depth, i.e., the maximum number of commands that may be stored in the command queue, may be 32. The command queue may be a circular queue, in which a head pointer and a tail pointer respectively indicate the beginning and end of a command sequence stored therein.

Each of the storage unit 2221 may include a memory cell array (not shown) and a control circuit (not shown), which controls the operation of the memory cell array. The memory cell array may include a 2D memory cell array or a 3D memory cell array. The memory cell array includes a plurality of memory cells. Each of the memory cells may be a single-level cell (SLC) storing one bit of information or a cell, such as a multi-level cell (MLC), a triple-level cell (TLC), or a quadruple-level cell (QLC), which stores at least two bits of information. A 3D memory cell array may include a vertically-oriented NAND string, in which at least one memory cell is arranged above another memory cell.

Supply voltages VCC, VCCQ1, and VCCQ2 may be input to the UFS device 2200. The supply voltage VCC may be a main supply voltage for the UFS device 2200 and may have a value of about 2.4 V to about 3.6 V. The supply voltage VCCQ1 may be used for supply of a voltage in a low range and mainly used for the UFS device controller 2210. The supply voltage VCCQ1 may have a value of about 1.14 V to about 1.26 V. The supply voltage VCCQ2 may be used to supply a voltage that is lower than the supply voltage VCC and higher than the supply voltage VCCQ1 and mainly used for an input/output interface such as the MIPI M-PHY 1251. The supply voltage VCCQ2 may have a value of about 1.7 V to about 1.95 V. Each of the supply voltages VCC, VCCQ1, and VCCQ2 may be supplied to a corresponding element of the UFS device 2200 through the regulator 2260. The regulator 2260 may be implemented as a group of regulator units respectively connected to the supply voltages VCC, VCCQ1, and VCCQ2.

Figure 12:
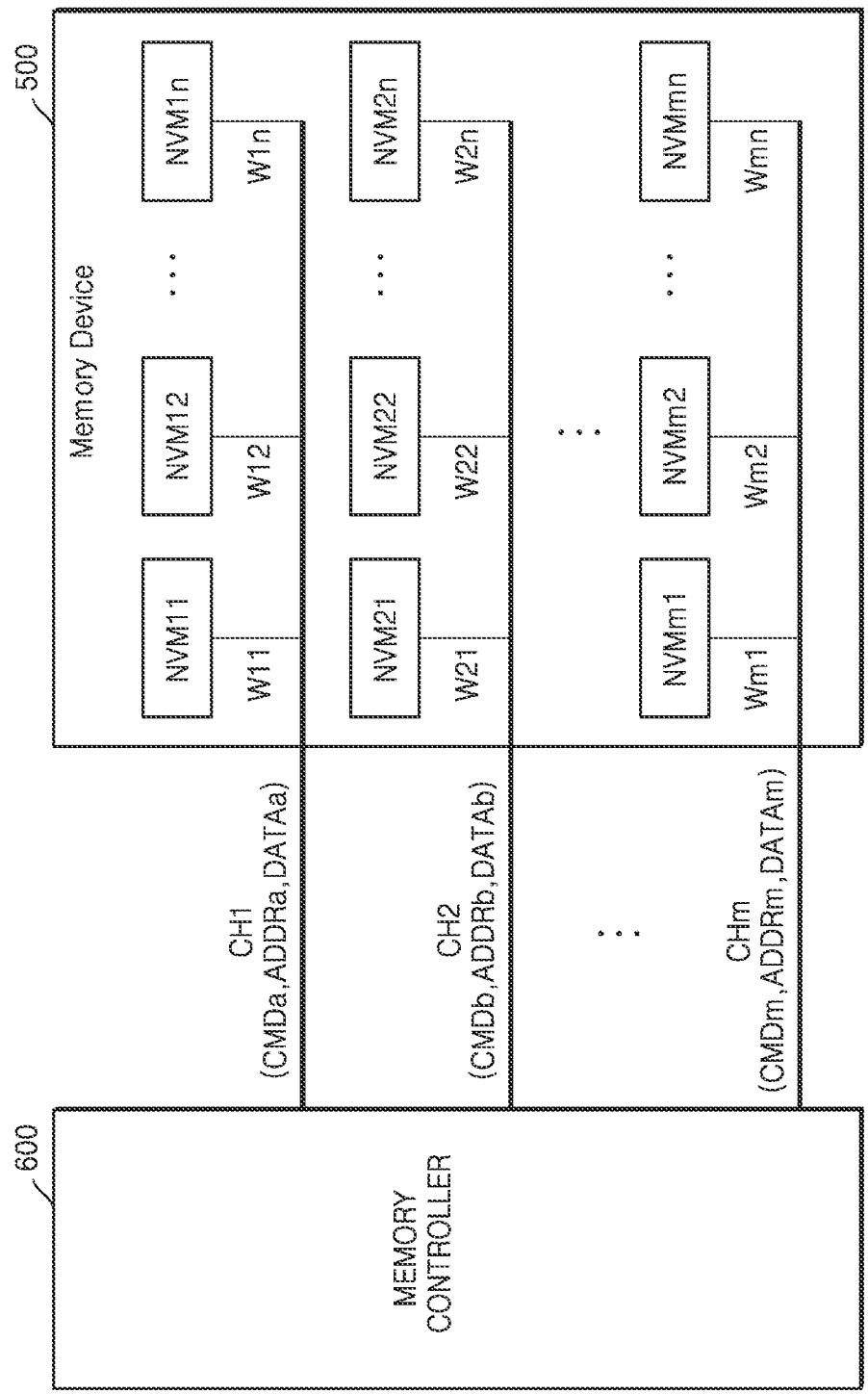
FIG. 12 is a block diagram illustrating a memory system according to embodiments of the inventive concept.

FIG. 12 is a block diagram illustrating a memory system 30 according to embodiments of the inventive concept.

Referring to FIG. 12, a memory system 30 may include a memory device 500 and a memory controller 600. The memory system 30 may support a plurality of channels, e.g., first through m-th channels CH1 through CHm. The memory device 500 may be connected to the memory controller 600 through the first through m-th channels CH1 through CHm. For example, the memory system 30 may be implemented by a storage device such as an SSD.

The memory device 500 may include a plurality of NVM devices NVM11 through NVMmn. Each of the NVM devices NVM11 through NVMmn may be connected to one of the first through m-th channels CH1 through CHm via a corresponding way. For example, the NVM devices NVM11 through NVM1$n$ may be connected to the first channel CH1 via ways W11 through W1$n$, respectively. The NVM devices NVM21 through NVM2$n$ may be connected to the second channel CH2 via ways W21 through W2$n$, respectively. In an example embodiment, each of the NVM devices NVM11 through NVMmn may be implemented by a memory unit that may operate according an individual command from the memory controller 600. For example, each of the NVM devices NVM11 through NVMmn may be implemented in a chip or a die, but embodiments are not limited thereto.

The memory controller 600 may exchange signals with the memory device 500 through the first through m-th channels CH1 through CHm. For example, the memory controller 600 may transmit commands CMDa through CMDm, addresses ADDRa through ADDRm, and data DATAa through DATAm to the memory device 500 through the first through m-th channels CH1 through CHm or receive the data DATAa through DATAm from the memory device 500 through the first through m-th channels CH1 through CHm.

The memory controller 600 may select one of NVM devices, which are connected to a channel, through the channel and may exchange signals with the selected NVM device. For example, the memory controller 600 may select the NVM device NVM11 among the NVM devices NVM11 through NVM1$n$ connected to the first channel CH1. The memory controller 600 may transmit the command CMDa, the address ADDRa, and the data DATAa to the NVM device NVM11, which has been selected, through the first channel CH1 or receive the data DATAa from the NVM device NVM11, which has been selected, through the first channel CH1.

The memory controller 600 may exchange signals with the memory device 500 in parallel through different channels. For example, while transmitting the command CMDa to the memory device 500 through the first channel CH1, memory controller 600 may transmit the command CMDb to the memory device 500 through the second channel CH2. For example, while receiving the data DATAa from the memory device 500 through the first channel CH1, the memory controller 600 may receive the data DATAb from the memory device 500 through the second channel CH2.

The memory controller 600 may generally control operations of the memory device 500. The memory controller 600 may transmit a signal to the first through m-th channels CH1 through CHm to control each of the NVM devices NVM11 through NVMmn connected to the first through m-th channels CH1 through CHm. For example, the memory controller 600 may transmit the command CMDa and the address ADDRa to the first channel CH1 to control a selected one of the NVM devices NVM11 through NVM1n.

Each of the NVM devices NVM11 through NVMmn may operate under the control of the memory controller 600. For example, the NVM device NVM11 may program the data DATAa according to the command CMDa, the address ADDRa, and the data DATAa, which are provided to the first channel CH1. For example, the NVM device NVM21 may read the data DATAb according to the command CMDb and the address ADDRb, which are provided to the second channel CH1, and transmit the data DATAb, which has been read, to the memory controller 600.

Although the memory device 500 communicate with the memory controller 600 through "m" channels and include "n" NVM devices in correspondence to each of the "m" channels in FIG. 12, the number of channels and the number of NVM devices connected to each channel may be variously changed.

Figure 13:
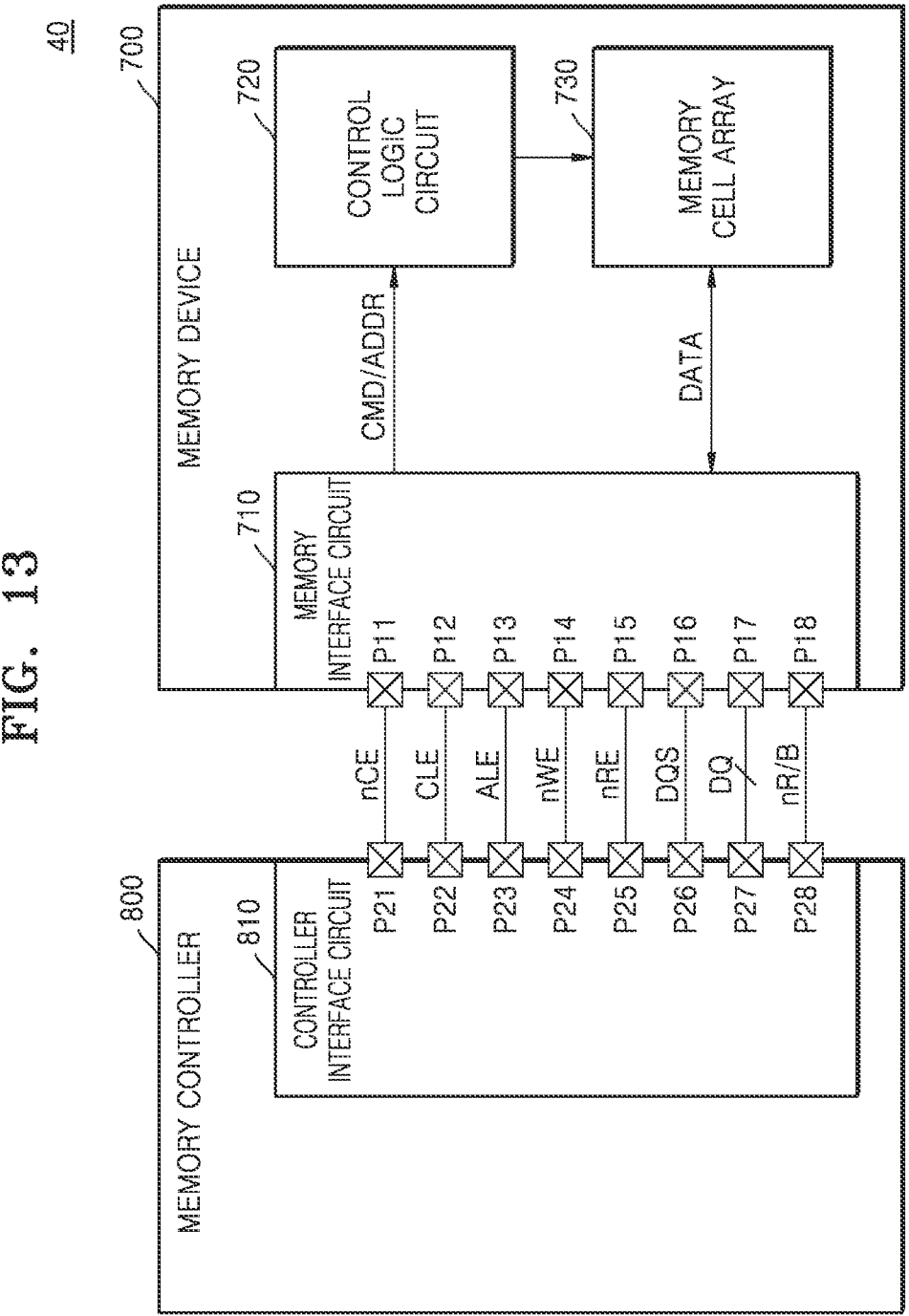
FIG. 13 is a block diagram illustrating a memory system according to embodiments of the inventive concept.

FIG. 13 is a block diagram illustrating a memory system 40 according to embodiments of the inventive concept.

Referring to FIG. 13, the memory system 40 may generally include a memory device 700 and a memory controller 800. The memory device 700 may correspond to one of the NVM devices NVM11 through NVMmn communicating with the memory controller 800 based on one of the first through m-th channels CH1 through CHm in FIG. 12. The memory controller 800 may correspond to the memory controller 600 in FIG. 12.

The memory device 700 may include first through eighth pins P11 through P18, a memory interface circuit 710, a control logic circuit 720, and a memory cell array 730.

The memory interface circuit 710 may receive a chip enable signal nCE from the memory controller 800 through the first pin P11. The memory interface circuit 710 may exchange signals with the memory controller 800 through the second through eighth pins P12 through P18 according to the chip enable signal nCE. For example, when the chip enable signal nCE is enabled (e.g., at a low level), the memory interface circuit 710 may exchange signals with the memory controller 800 through the second through eighth pins P12 through P18 according to the chip enable signal nCE.

The memory interface circuit 710 may receive a command latch enable signal CLE, an address latch enable signal ALE, and a write enable signal nWE from the memory controller 800 through the second through fourth pins P12 through P14, respectively. The memory interface circuit 710 may receive or transmit a data signal DQ from or to the memory controller 800 through the seventh pin P17. A command CMD, an address ADDR, and data may be transmitted through the data signal DQ. For example, the data signal DQ may be transmitted through a plurality of data signal lines. In this case, the seventh pin P17 may include a plurality of pins respectively corresponding to the data signals.

The memory interface circuit 710 may acquire the command CMD from the data signal DQ, which is received in an enable period (e.g., a high level state) of the command latch enable signal CLE, based on toggle timings of the write enable signal nWE. The memory interface circuit 710 may acquire the address ADDR from the data signal DQ, which is received in an enable period (e.g., a high level state) of the address latch enable signal ALE, based on the toggle timings of the write enable signal nWE.

In an example embodiment, the write enable signal nWE may remain in a static state (e.g., a high level or a low level) and toggle between the high level and the low level. For example, the write enable signal nWE may toggle in a period in which the command CMD or the address ADDR is transmitted. Accordingly, the memory interface circuit 710 may acquire the command CMD or the address ADDR based on the toggle timings of the write enable signal nWE.

The memory interface circuit 710 may receive a read enable signal nRE from the memory controller 800 through the fifth pin P15. The memory interface circuit 710 may receive or transmit a data strobe signal DQS from or to the memory controller 800 through the sixth pin P16.

In a data output operation of the memory device 700, the memory interface circuit 710 may receive the read enable signal nRE, which toggles, through the fifth pin P15 before outputting the data. The memory interface circuit 710 may generate the data strobe signal DQS, which toggles, based on toggling of the read enable signal nRE. For example, the memory interface circuit 710 may generate the data strobe signal DQS, which starts toggling after a certain delay (e.g., tDQSRE) from a toggling start time of the read enable signal nRE. The memory interface circuit 710 may transmit the data signal DQ including the data based on toggle timings of the data strobe signal DQS. Accordingly, the data may be transmitted to the memory controller 800 in alignment with the toggle timings of the data strobe signal DQS.

In a data input operation of the memory device 700, when the data signal DQ including the data is received from the memory controller 800, the memory interface circuit 710 may receive the data strobe signal DQS, which toggles, from the memory controller 800 together with the data. The memory interface circuit 710 may acquire the data from the data signal DQ based on the toggle timings of the data strobe signal DQS. For example, the memory interface circuit 710 may acquire the data by sampling the data signal DQ at rising and falling edges of the data strobe signal DQS.

The memory interface circuit 710 may transmit a ready/busy output signal nR/B to the memory controller 800 through the eighth pin P18. The memory interface circuit 710 may transmit state information of the memory device 700 to the memory controller 800 through the ready/busy output signal nR/B. When the memory device 700 is in a busy state (that is, when internal operations of the memory device 700 are being performed), the memory interface circuit 710 may transmit the ready/busy output signal nR/B indicating the busy state to the memory controller 800. When the memory device 700 is in a ready state (that is, when internal operations of the memory device 700 are not performed or are completed), the memory interface circuit 710 may transmit the ready/busy output signal nR/B indicating the ready state to the memory controller 800. For example, while the memory device 700 is reading the data from the memory cell array 730 in response to a read command, the memory interface circuit 710 may transmit the ready/busy output signal nR/B indicating the busy state (e.g., a low level) to the memory controller 800. For example, while the memory device 700 is programming the data to the memory cell array 730 in response to a program command, the memory interface circuit 710 may transmit the ready/busy output signal nR/B indicating the busy state to the memory controller 800.

The control logic circuit 720 may generally control various operations of the memory device 700. The control logic circuit 720 may receive the command CMD and/or the address ADDR from the memory interface circuit 710. The control logic circuit 720 may generate control signals for controlling other elements of the memory device 700 according to the command CMD and/or the address ADDR. For example, the control logic circuit 720 may generate various control signals for programming the data to the memory cell array 730 or reading the data from the memory cell array 730.

The memory cell array 730 may store the data from the memory interface circuit 710 under the control of the control logic circuit 720. The memory cell array 730 may output the data, which has been stored therein, to the memory interface circuit 710 under the control of the control logic circuit 720.

The memory cell array 730 may include a plurality of memory cells. For example, the memory cells may include flash memory cells. However, embodiments are not limited thereto. The memory cells may include RRAM cells, FeRAM cells, PRAM cells, thyristor RAM (TRAM) cells, or MRAM cells. Hereinafter, embodiments will be described focusing on the case where the memory cells include NAND flash memory cells.

The memory controller 800 may include first through eighth pins P21 through P28 and a controller interface circuit 810. The first through eighth pins P21 through P28 may respectively correspond to the first through eighth pins P11 through P18 of the memory device 700.

The controller interface circuit 810 may transmit the chip enable signal nCE to the memory device 700 through the first pin P21. The controller interface circuit 810 may exchange signals with the memory device 700 through the second through eighth pins P22 through P28 according to the chip enable signal nCE.

The controller interface circuit 810 may transmit the command latch enable signal CLE, the address latch enable signal ALE, and the write enable signal nWE to the memory device 700 through the second through fourth pins P22 through P24, respectively. The controller interface circuit 810 may transmit or receive the data signal DQ to or from the memory device 700 through the seventh pin P27.

The controller interface circuit 810 may transmit the data signal DQ, which includes the command CMD or the address ADDR, to the memory device 700 together with the write enable signal nWE, which toggles. The controller interface circuit 810 may transmit the data signal DQ including the command CMD to the memory device 700 by transmitting the command latch enable signal CLE, which is in the enable state, and transmit the data signal DQ including the address ADDR to the memory device 700 by transmitting the address latch enable signal ALE, which is in the enable state.

The controller interface circuit 810 may transmit the read enable signal nRE to the memory device 700 through the fifth pin P25. The controller interface circuit 810 may receive or transmit the data strobe signal DQS from or to the memory device 700 through the sixth pin P26.

In a data output operation of the memory device 700, the controller interface circuit 810 may generate and transmit the read enable signal nRE, which toggles, to the memory device 700. For example, before the output of the data, the controller interface circuit 810 may generate the read enable signal nRE, which is converted from a static state (e.g., a high level or a low level) into a toggling state. Accordingly, the memory device 700 may generate the data strobe signal DQS, which toggles, based on the read enable signal nRE. The controller interface circuit 810 may receive the data signal DQ including the data and the data strobe signal DQS, which toggles, from the memory device 700. The controller interface circuit 810 may acquire the data from the data signal DQ based on the toggle timings of the data strobe signal DQS.

In a data input operation of the memory device 700, the controller interface circuit 810 may generate the data strobe signal DQS, which toggles. For example, before transmitting the data, the controller interface circuit 810 may generate the data strobe signal DQS, which is converted from a static state (e.g., a high level or a low level) into a toggling state. The controller interface circuit 810 may transmit the data signal DQ including the data to the memory device 700 based on the toggle timings of the data strobe signal DQS.

The controller interface circuit 810 may receive the ready/busy output signal nR/B from the memory device 700 through the eighth pin P28. The controller interface circuit 810 may determine state information of the memory device 700 based on the ready/busy output signal nR/B.

Figure 14:
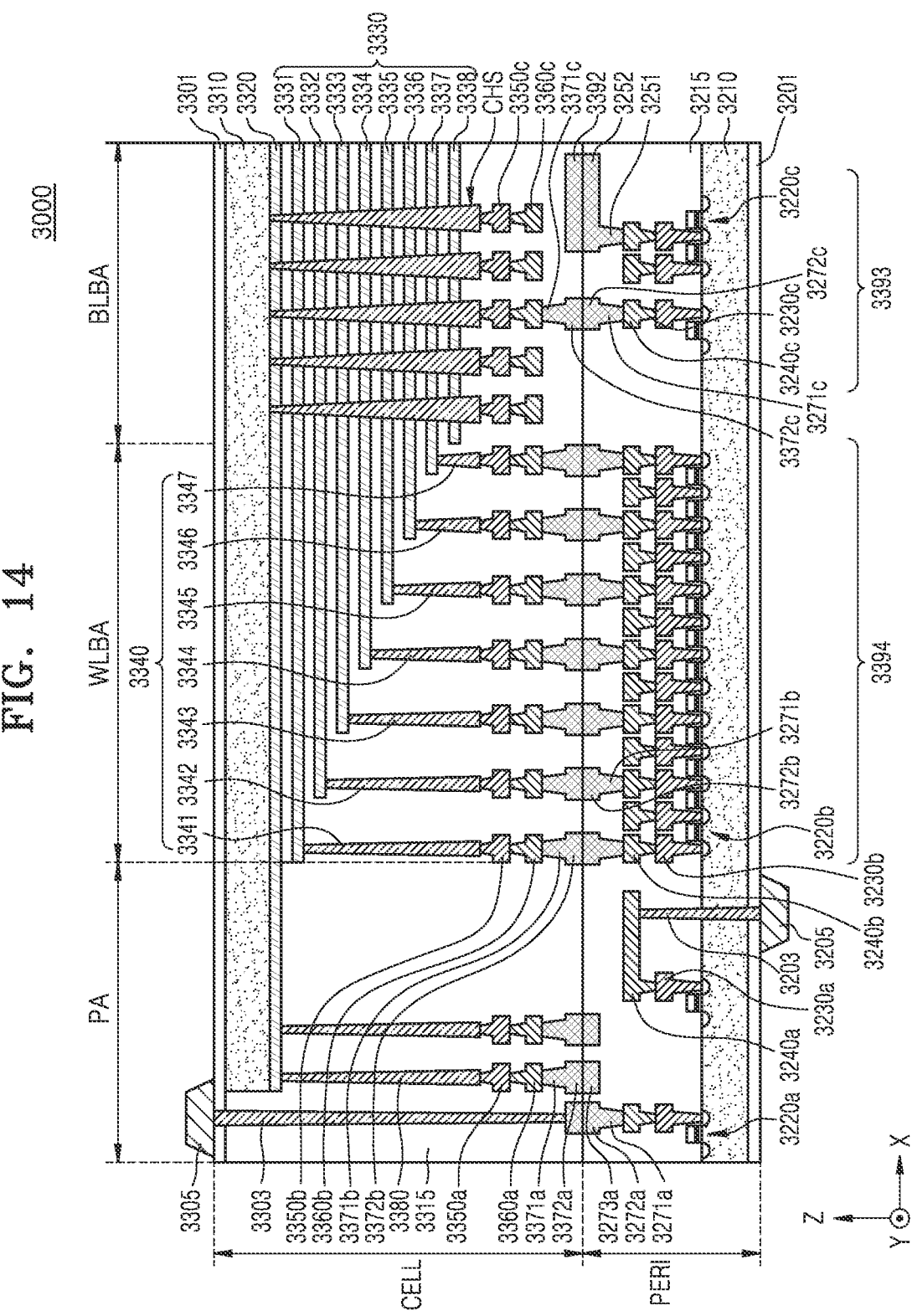
FIG. 14 is a cross-sectional diagram illustrating a bonding vertical NAND (B-VNAND) structure applicable to a UFS device according to embodiments of the inventive concept.

FIG. 14 is a cross-sectional diagram illustrating a bonding VNAND (B-VNAND) structure applicable to a UFS device according to embodiments of the inventive concept.

Referring to FIG. 14, a memory device 3000 may have a chip-to-chip (C2C) structure. In the C2C structure, an upper chip including a cell area CELL may be formed on a first wafer, a lower chip including a peripheral circuit area PERI may be formed on a second wafer different from the first wafer, and the upper chip may be connected to the lower chip using a bonding method. For example, the bonding method may include a method of electrically connecting a bonding metal formed in a topmost metal layer of the upper chip to a bonding metal formed in a topmost metal layer of the lower chip. For example, when the bonding metal includes copper (Cu), the bonding method may include a Cu—Cu bonding method. The bonding metal may include aluminum or tungsten.

Each of the peripheral circuit area PERI and the cell area CELL of the memory device 3000 may include an external pad bonding area PA, a word line bonding area WLBA, and a bit line bonding area BLBA.

The peripheral circuit area PERI may include a first substrate 3210, an interlayer insulating layer 3215, a plurality of circuit devices 3220a, 3220b, and 3220c formed in the first substrate 3210, first metal layers 3230a, 3230b, and 3230c respectively connected to the circuit devices 3220a, 3220b, and 3220c, and second metal layers 3240a, 3240b, and 3240c respectively formed on the first metal layers 3230a, 3230b, and 3230c. In an embodiment, the first metal layers 3230a, 3230b, and 3230c may include tungsten having a relatively higher resistance, and the second metal layers 3240a, 3240b, and 3240c may include copper having a relatively lower resistance.

In this specification, only the first metal layers 3230a, 3230b, and 3230c and the second metal layers 3240a, 3240b, and 3240c are illustrated and described, but embodiments are not limited thereto. At least one metal layer may be further formed on the second metal layers 3240a, 3240b, and 3240c. At least a portion of the at least one metal layer on the second metal layers 3240a, 3240b, and 3240c may include aluminum, which has a lower resistance than copper included in the second metal layers 3240a, 3240b, and 3240c.

The interlayer insulating layer 3215 may be arranged on the first substrate 3210 to cover the circuit devices 3220a, 3220b, and 3220c, the first metal layers 3230a, 3230b, and 3230c, and the second metal layers 3240a, 3240b, and 3240c and may include an insulating material such as silicon oxide or silicon nitride.

Lower bonding metals 3271b and 3272b may be formed on the second metal layer 3240b in the word line bonding area WLBA. In the word line bonding area WLBA, the lower bonding metals 3271b and 3272b of the peripheral circuit area PERI may be electrically connected to upper bonding metals 3371b and 3372b of the cell area CELL using a bonding method. The lower bonding metals 3271b and 3272b and the upper bonding metals 3371b and 3372b may include aluminum, copper, or tungsten.

The cell area CELL may provide at least one memory block. The cell area CELL may include a second substrate 3310 and a common source line 3320. A plurality of word lines 3331 through 3338 (collectively denoted by 3330) may be stacked on the second substrate 3310 in a direction (e.g., a Z-axis direction) perpendicular to a top surface of the second substrate 3310. String selection lines may be arranged above the word lines 3330 and a ground selection line may be arranged below the word lines 3330. The word lines 3330 may be arranged between the string selection lines and the ground selection line.

In the bit line bonding area BLBA, a channel structure CHS may extend in the direction perpendicular to the top surface of the second substrate 3310 and pass through the word lines 3330, the string selection lines, and the ground selection line. The channel structure CHS may include a data storage layer, a channel layer, and a buried insulating layer. The channel layer may be electrically connected to a first metal layer 3350c and a second metal layer 3360c. For example, the first metal layer 3350c may correspond to a bit line contact, and the second metal layer 3360c may correspond to a bit line and may be referred to as a bit line 3360c below. In an embodiment, the bit line 3360c may extend in a first direction (e.g., a Y-axis direction) parallel with the top surface of the second substrate 3310.

In the embodiment of FIG. 14, an area, in which the channel structure CHS and the bit line 3360c are arranged, may be defined as the bit line bonding area BLBA. The bit line 3360c may be electrically connected to circuit devices 3220c, which provide a page buffer 3393 in the peripheral circuit area PERI, in the bit line bonding area BLBA. For example, the bit line 3360c may be connected to upper bonding metals 3371c and 3372c in the bit line bonding area BLBA, and the upper bonding metals 3371c and 3372c may be connected to lower bonding metals 3271c and 3272c connected to the circuit devices 3220c of the page buffer 3393.

In the word line bonding area WLBA, the word lines 3330 may extend in a second direction (e.g., an X-axis direction) parallel with the top surface of the second substrate 3310 and may be connected to a plurality of cell contact plugs 3341 through 3347 (collectively denoted by 3340). The word lines 3330 may be connected to the cell contact plugs 3340 through pads, which are provided by at least some of the word lines 3330 extending in different lengths in the second direction. A first metal layer 3350b and a second metal layer 3360b may be sequentially stacked on each of the cell contact plugs 3340 connected to the word lines 3330. The cell contact plugs 3340 in the word line bonding area WLBA may be connected to the peripheral circuit area PERI through the upper bonding metals 3371b and 3372b of the cell area CELL and the lower bonding metals 3271b and 3272b of the peripheral circuit area PERI.

The cell contact plugs 3340 may be electrically connected to circuit devices 3220b, which provide a row decoder 3394 in the peripheral circuit area PERI. In an embodiment, operating voltages of the circuit devices 3220b providing the row decoder 3394 may be different from operating voltages of the circuit devices 3220c providing the page buffer 3393. For example, the operating voltages of the circuit devices 3220c providing the page buffer 3393 may be greater than the operating voltages of the circuit devices 3220b providing the row decoder 3394.

A common source line contact plug 3380 may be arranged in the external pad bonding area PA. The common source line contact plug 3380 may include a conductive material such as metal, a metal compound, or polysilicon and may be electrically connected to the common source line 3320. A first metal layer 3350a and a second metal layer 3360a may be sequentially stacked on the common source line contact plug 3380. For example, an area, in which the common source line contact plug 3380, the first metal layer 3350a, and the second metal layer 3360a are arranged, may be defined as the external pad bonding area PA.

First and second input/output pads 3205 and 3305 may be arranged in the external pad bonding area PA. Referring to FIG. 14, a lower insulating film 3201 covering a bottom surface of the first substrate 3210 may be formed below the first substrate 3210, and the first input/output pad 3205 may be formed on the lower insulating film 3201. The first input/output pad 3205 may be connected to at least one of the circuit devices 3220a, 3220b, and 3220c of the peripheral circuit area PERI through a first input/output contact plug 3203 and may be isolated from the first substrate 3210 by the lower insulating film 3201. A side insulating film may be arranged between the first input/output contact plug 3203 and the first substrate 3210 to electrically isolate the first input/output contact plug 3203 from the first substrate 3210.

Referring to FIG. 14, an upper insulating film 3301 covering a top surface of the second substrate 3310 may be formed above the second substrate 3310, and the second input/output pad 3305 may be arranged on the upper insulating film 3301. The second input/output pad 3305 may be connected to at least one of the circuit devices 3220a, 3220b, and 3220c of the peripheral circuit area PERI through a second input/output contact plug 3303.

According to embodiments, the second substrate 3310 and the common source line 3320 may not be arranged in an area, in which the second input/output contact plug 3303 is arranged. The second input/output pad 3305 may not overlap the word lines 3330 in a third direction (e.g., the Z-axis direction). Referring to FIG. 14, the second input/output contact plug 3303 may be separated from the second substrate 3310 in the direction parallel with the top surface of the second substrate 3310 and may pass through an interlayer insulating layer 3315 of the cell area CELL to be connected to the second input/output pad 3305.

According to embodiments, the first input/output pad 3205 and the second input/output pad 3305 may be selectively formed. For example, the memory device 3000 may include only the first input/output pad 3205 on the first substrate 3210 or only the second input/output pad 3305 on the second substrate 3310. Alternatively, the memory device 3000 may include both the first input/output pad 3205 and the second input/output pad 3305.

A metal pattern of a topmost metal layer may be provided as a dummy pattern in the external pad bonding area PA of each of the cell area CELL and the peripheral circuit area PERI, or the topmost metal layer may be empty.

In correspondence to an upper metal pattern 3372*a* in the topmost metal layer of the cell area CELL, a lower metal pattern 3273*a* having the same shape as upper metal pattern 3372*a* of the cell area CELL may be formed in a topmost metal layer of the peripheral circuit area PERI in the external pad bonding area PA. The lower metal pattern 3273*a* in the topmost metal layer of the peripheral circuit area PERI may not be connected to a contact in the peripheral circuit area PERI. Similarly, in correspondence to a lower metal pattern in the topmost metal layer of the peripheral circuit area PERI in the external pad bonding area PA, an upper metal pattern having the same shape as lower metal pattern of the peripheral circuit area PERI may be formed in the topmost metal layer of the cell area CELL.

The lower bonding metals 3271*b* and 3272*b* may be formed on the second metal layer 3240*b* in the word line bonding area WLBA. In the word line bonding area WLBA, the lower bonding metals 3271*b* and 3272*b* of the peripheral circuit area PERI may be electrically connected to the upper bonding metals 3371*b* and 3372*b* of the cell area CELL using a bonding method.

In correspondence to a lower metal pattern 3252 formed in the topmost metal layer of the peripheral circuit area PERI, in the bit line bonding area BLBA, an upper metal pattern 3392 having the same shape as the lower metal pattern 3252 of the peripheral circuit area PERI may be formed on the topmost metal layer of the cell area CELL. A contact may not be formed on the upper metal pattern 3392 in the topmost metal layer of the cell area CELL.

While the inventive concept has been particularly shown and described with reference to embodiments thereof, it will be understood that various changes in form and details may be made therein without departing from the spirit and scope of the following claims.

What is claimed is:

1. A storage system configured to communicate with a host system, the storage system comprising:
    a memory device; and
    a controller configured to receive new data and an overwrite request from the host system, wherein the overwrite request includes a first logical address for old data and a second logical address, different from the first logical address, for the new data, and perform an overwrite operation by writing the new data corresponding to the second logical address to the memory device in response to the overwrite request and invalidating the old data corresponding to the first logical address in response to the overwrite request.

2. The storage system of claim 1, wherein the controller includes a memory storing metadata including mapping information between logical addresses and physical addresses, and the controller is further configured to update the metadata when the new data is written to the memory device and the old data is invalidated.

3. The storage system of claim 2, wherein the update of the metadata includes invalidating mapping information between the first logical address and a first physical address and adding mapping information between the second logical address and a second physical address to the metadata.

4. The storage system of claim 1, wherein the overwrite request includes a field value indicating a write command type, and
    the invalidating of the old data is performed when the field value indicating the write command type is a first value, and the invalidating of the old data is not performed when the field value indicating the write command type is a second value different from the first value.

5. The storage system of claim 1, wherein the controller includes a memory storing metadata for the old data and the new data, and a metadata manager circuit configured to manage the metadata, and
    the controller is further configured to sequentially receive from the host system, a plurality of overwrite requests respectively associated with partial data resulting from data splitting,
    wherein the metadata manager circuit is configured to update the memory according to changes in the metadata resulting from performing overwrites corresponding to the plurality of overwrite requests.

6. The storage system of claim 5, wherein each of the plurality of overwrite requests includes a field value indicating whether an overwrite is performed as an atomic write, and
    the update of the memory is selectively performed according to the field value indicating whether an overwrite for each of the plurality of overwrite requests is performed as an atomic write.

7. The storage system of claim 6, wherein the metadata manager circuit is further configured to update the memory according to changes in the metadata each time when an overwrite is performed in response to each one of the plurality of overwrite requests.

8. The storage system of claim 6, wherein changed metadata is sequentially buffered in a buffer until changes resulting from the performing of the overwrites corresponding to the plurality of overwrite requests are complete, and thereafter,
    the metadata manager circuit is further configured to update the memory according to the buffered metadata.

9. A controller for a storage system, the controller configured to communicate with a host system, receive new data and an overwrite request from the host system, wherein the overwrite request includes a first logical address for old data and a second logical address, different from the first logical address, for the new data, and perform an overwrite operation by writing the new data corresponding to the second logical address to a memory device in response to the overwrite request and invalidating the old data corresponding to the first logical address in response to the overwrite request.

10. The controller of claim 9, wherein the controller is further configured to update metadata including mapping information between logical addresses and physical addresses when the new data is written to the memory device and the old data is invalidated.

11. The controller of claim 10, wherein the controller is further configured to invalidate mapping information between the first logical address and a first physical address in the metadata, and add mapping information between the second logical address and a second physical address to the metadata.

12. The controller of claim 9, wherein the overwrite request includes a field value indicating a write command type,
    the controller is further configured to invalidate the old data when the overwrite request includes the first logical address and the field value indicating a write command type is a first value, and the controller is further configured not to invalidate the old data when the overwrite request does not include the first logical address and the field value indicating a write command type is a second value different from the first value.

13. The controller of claim 9, wherein the controller includes a memory storing metadata for the old data and metadata for the new data, and a metadata manager circuit configured to manage the metadata, the controller further configured to sequentially receive from the host system, a plurality of overwrite requests respectively associated with partial data resulting from data splitting, and the metadata manager circuit is configured to update the memory according to changes in the metadata associated with performing overwrite operations corresponding to the plurality of overwrite requests.

14. The controller of claim 13, wherein each one of the plurality of overwrite requests includes a field value indicating whether an overwrite is performed by an atomic write, and the controller is further configured to respectively perform an overwrite operation in response to the field value indicating whether an overwrite for each of the plurality of overwrite requests is performed as an atomic write.

15. The controller of claim 14, wherein the metadata manager circuit is further configured to update the memory according to changes in the metadata for each one of the overwrite operations.

16. The controller of claim 14, wherein changes to the metadata are stored in a buffer for each one of the overwrite operations corresponding to the plurality of overwrite requests; and the metadata manager circuit is further configured to update the memory according to the metadata stored in the buffer upon completion of a last one of the overwrite operations.

17. An operating method of a storage system configured to communicate with a host system, the operating method comprising:

receiving new data and an overwrite request corresponding to a file update request from the host system, wherein the overwrite request including a first logical address for old data and a second logical address, different from the first logical address, for the new data;

writing the new data corresponding to the second logical address to a memory device of the storage system in an overwrite operation in response to the overwrite request; and updating the memory device according to metadata for the old data and metadata for the new data in response to the overwrite operation performed in response to the overwrite request.

18. The operating method of claim 17, wherein the metadata includes mapping information between logical addresses and physical addresses, and the updating of the memory device includes invalidating mapping information between the first logical address and a first physical address in the metadata, and adding mapping information between the second logical address and a second physical address to the metadata.

19. The operating method of claim 17, wherein the overwrite request includes a field value indicating a write command type, and the updating of the memory device includes invalidating the old data when the overwrite request includes the first logical address and the field value indicating a write command type is a first value.

20. The operating method of claim 17, wherein the receiving includes sequentially receiving a plurality of overwrite requests respectively associated with a plurality of partial data resulting from a data splitting when a size of data included in the overwrite request exceeds a reference value, and each one of the plurality of overwrite requests includes a field value indicating whether an overwrite operation is performed by an atomic write.

* * * * *